(12) United States Patent
Zhao et al.

(10) Patent No.: US 12,306,334 B2
(45) Date of Patent: May 20, 2025

(54) METHOD FOR ELIMINATING ONE-BIT SIGNAL HARMONIC FALSE TARGET AND RELATED COMPONENT

(71) Applicant: SHENZHEN UNIVERSITY, Guangdong (CN)

(72) Inventors: Bo Zhao, Guangdong (CN); Weijian Yuan, Guangdong (CN); Lei Huang, Guangdong (CN); Wanxing Hou, Guangdong (CN); Haozhen Wang, Guangdong (CN); Yiqian Geng, Guangdong (CN); Guangyu Yang, Guangdong (CN); Lin Zha, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 379 days.

(21) Appl. No.: 18/096,037

(22) Filed: Jan. 12, 2023

(65) Prior Publication Data
US 2023/0152424 A1 May 18, 2023

Related U.S. Application Data

(63) Continuation-in-part of application No. PCT/CN2021/098573, filed on Jun. 7, 2021.

(30) Foreign Application Priority Data

Jul. 13, 2020 (CN) .......................... 202010669865.2

(51) Int. Cl.
*G01S 7/35* (2006.01)
(52) U.S. Cl.
CPC .............. *G01S 7/354* (2013.01); *G01S 7/356* (2021.05)

(58) Field of Classification Search
None
See application file for complete search history.

(56) References Cited

U.S. PATENT DOCUMENTS 5,608,404 A * 3/1997 Burns ................. G01S 13/9027
342/25 A

OTHER PUBLICATIONS

Bo Zhao et al., 1-bit SAR Imaging Method Based on Single-frequency Time-varying Threshold, Journal of Radars, Aug. 2018, pp. 446-454, vol. 7, No. 4.

(Continued)

*Primary Examiner* — Ladimir Magloire
*Assistant Examiner* — Brandon James Henson

(57) ABSTRACT

Disclosed in the present invention are a method for eliminating a one-bit signal harmonic false target and a related component. In the method, dechirping, a frequency shift, one-bit quantization, AD sampling, and a Fourier transform are performed on an echo signal to obtain a frequency spectrum, and then constant false alarm rate detection is performed on the frequency spectrum, to obtain a distance of a real target and a distance of a false target. For the distance of the false target, a difference comparison is performed on multiple snapshot-based angle of arrival information and single snapshot-based angle of arrival information, a distance corresponding to an angle with the smallest angle difference is obtained from the single snapshot-based angle of arrival information, and the distance is used as the distance of the real target, thereby eliminating the false target and then reducing costs of data acquisition, transmission, storage, and processing.

20 Claims, 11 Drawing Sheets

(56) References Cited

OTHER PUBLICATIONS

Benzhou Jin et al., One-Bit LFMCW Radar: Spectrum Analysis and Target Detection, IEEE Transactions on Aerospace and Electronic Systems, Aug. 2020, pp. 2732-2750, vol. 56, No. 4.

* cited by examiner

METHOD FOR ELIMINATING ONE-BIT SIGNAL HARMONIC FALSE TARGET AND RELATED COMPONENT

CROSS REFERENCE TO RELATED APPLICATIONS

This application is a Continuation-In-Part of International Application No. PCT/CN2021/098573 filed on Jun. 7, 2021, which is based upon and claims priority to Chinese Patent Application No. 202010669865.2, filed on Jul. 13, 2020, the entire contents of which are incorporated herein by reference.

TECHNICAL FIELD

The present invention relates to the field of data acquisition and radar system applications, and in particular, to a method for eliminating a one-bit signal harmonic false target and a related component.

BACKGROUND

A millimeter-wave array radar, which has an all-day, all-whether, long-distance, and high-resolution detection capability, plays an important role in many fields such as assisted driving, target detection, and altitude hold and obstacle avoidance of an unmanned aerial vehicle, and is a research hotspot for scholars at home and abroad. However, as signal bandwidth is broadened and a quantity of receiving channels of an array radar increases, the burden of data acquisition, transmission, and processing also becomes increasingly heavy. On one hand, an array radar system needs to perform high-precision sampling on echo data to retain complete signal features, which leads to an increase in a data processing bit width and puts forward a higher requirement on hardware performance of the system. On the other hand, a signal sampling rate also needs to be correspondingly increased to avoid the aliasing of a signal spectrum, resulting in reduced efficiency of data processing.

To resolve the foregoing problem, the existing literature "Research on One-bit SAR Imaging Method Based on Single-frequency Time-varying Threshold" ([J]. Journal of Radars, 2018, 7(04):446-454) analyzes a case in which one-bit quantization and sampling enable data to constantly jump between 1 and −1, and as a result introduce a high-order harmonic wave of an original signal. Based on this, the literature provides a one-bit echo collection scheme based on a single-frequency time-varying threshold. In this scheme, a high-order harmonic wave in an echo wave is removed from an active component by using the single-frequency time-varying threshold, thereby improving imaging quality. However, this method is aimed at pulse radars and is implemented by constructing matched filtering.

Furthermore, the literature "One-bit LFMCW Radar: Spectrum Analysis and Target Detection" ([J]0.2019, arXiv: 1905.09440. [Online]. Available: https://arxiv.org/abs/1905.09440) analyzes a harmonic effect generated due to one-bit quantization after a linear frequency modulation continuous wave radar performs dechirping, and provides a method in which dimension reduction (DR) is performed through linear pre-processing and pre-detection and then a high-order harmonic wave is suppressed through generalized approximate message passing (GAMP). However, to suppress the harmonic wave to the greatest extent, this method introduces sparse signal reconstruction, which limits a condition of a sparse scenario and increases processing complexity.

It can be learned from analysis of the foregoing literature that conventional one-bit quantization and sampling enable data to constantly jump between 1 and −1, and as a result introduce a high-order harmonic wave of an original signal. However, a false target is introduced due to the presence of the high-order harmonic wave. Assuming that a uniform linear array radar is used, there are 16 array elements, a spacing between array elements is half a wavelength, there are four targets in a distance dimension, and their distances from the radar are 10 m, 15 m, 20 m, and 30 m. FIG. 1 shows a result obtained through distance dimension compression and superposition after one-bit quantization and sampling are performed on dechirped signals from 16 channels. The black boxes in the figure mark distances of 4 real targets, and the remaining spectrum peaks are all about false targets of harmonic components introduced due to the one-bit quantization and sampling. Therefore, it can be seen that the introduction of the harmonic components has a great impact on the processing quality of a radar signal. To achieve a better detection effect after signal processing, it is very necessary to eliminate the false targets of these harmonic components.

SUMMARY

An objective of the present invention is to provide a method for eliminating a one-bit signal harmonic false target and a related component, aiming to resolve a problem that in the prior art, when one-bit quantization and sampling are performed on echo data of an array radar, a false target of a harmonic component is introduced, resulting in complex radar signal processing and a false detection result.

According to a first aspect, an embodiment of the present invention provides a method for eliminating a one-bit signal harmonic false target, including:

obtaining an echo signal of a probed target detected by an array radar, and dechirping the echo signal to obtain a dechirped echo signal;

performing a frequency shift on the dechirped echo signal, performing one-bit quantization on the dechirped echo signal on which the frequency shift has been performed, and then performing AD data acquisition to obtain dechirped signal data;

performing a Fourier transform on the dechirped signal data to obtain a frequency spectrum;

calculating normalized amplitude of a frequency spectrum of each channel to obtain an amplitude value, then performing constant false alarm rate detection to obtain distance of a real target and a distance of a false target, and saving sampling points corresponding to the distance of the real target and the distance of the false target; and obtaining sampling points without repetition through screening, and constructing a distance-channel data block;

performing a forward and backward spatial smoothing-based angle of arrival estimation on a single snapshot corresponding to each sampling point of the distance-channel data block, to obtain single snapshot-based angle of arrival information;

sampling the dechirped signal data after the one-bit quantization of each channel to obtain multiple snapshots, and performing a forward and backward spatial smoothing-based angle of arrival estimation on all the multiple snapshots to obtain multiple snapshot-based angle of arrival information; and performing a difference comparison on the single snapshot-based angle of arrival information and the multiple snapshot-based angle of arrival information, selecting a distance corresponding to an angle with the smallest angle difference from the single snapshot-based angle of arrival information, and using the distance as the distance of the real target.

According to a second aspect, an embodiment of the present invention provides an apparatus for eliminating a one-bit signal harmonic false target, including:

an obtaining unit, configured to: obtain an echo signal of a probed target detected by an array radar, and dechirp the echo signal to obtain a dechirped echo signal;

a sampling unit, configured to: perform a frequency shift on the dechirped echo signal, perform one-bit quantization on the dechirped echo signal on which the frequency shift has been performed, and then perform AD data acquisition to obtain dechirped signal data;

a Fourier transform unit, configured to perform a Fourier transform on the dechirped signal data to obtain a frequency spectrum;

a detection unit, configured to: calculate normalized amplitude of a frequency spectrum of each channel to obtain an amplitude value, then perform constant false alarm rate detection to obtain a distance of a real target and a distance of a false target, and save sampling points corresponding to the distance of the real target and the distance of the false target; and obtain sampling points without repetition through screening, and construct a distance-channel data block;

a first estimation unit, configured to perform a forward and backward spatial smoothing-based angle of arrival estimation on a single snapshot corresponding to each sampling point of the distance-channel data block, to obtain single snapshot-based angle of arrival information;

a second estimation unit, configured to: sample the dechirped signal data after the one-bit quantization of each channel to obtain multiple snapshots, and perform a forward and backward spatial smoothing-based angle of arrival estimation on all the multiple snapshots to obtain multiple snapshot-based angle of arrival information; and a difference comparison unit, configured to: perform a difference comparison on the single snapshot-based angle of arrival information and the multiple snapshot-based angle of arrival information, select a distance corresponding to an angle with the smallest angle difference from the single snapshot-based angle of arrival information, and use the distance as the distance of the real target.

According to a third aspect, an embodiment of the present invention further provides a computer device, including a memory, a processor, and a computer program stored in the memory and executable on the processor, where when the processor executes the computer program, the method for eliminating a one-bit signal harmonic false target according to the foregoing first aspect.

According to a fourth aspect, an embodiment of the present invention further provides a computer-readable storage medium, storing a computer program, where when the computer program is executed by a processor, the processor is caused to perform the method for eliminating a one-bit signal harmonic false target according to the foregoing first aspect.

Disclosed in the present invention are a method for eliminating a one-bit signal harmonic false target and a related component. In the method, dechirping, a frequency shift, one-bit quantization, AD sampling, and a Fourier transform are performed on an echo signal to obtain a frequency spectrum, and then constant false alarm rate detection is performed on the frequency spectrum, to obtain a distance of a real target and a distance of a false target. For the distance of the false target, a difference comparison is performed on multiple snapshot-based angle of arrival information and single snapshot-based angle of arrival information, a distance corresponding to an angle with the smallest angle difference is obtained from the single snapshot-based angle of arrival information, and the distance is used as the distance of the real target, thereby eliminating the false target. In the embodiments of the present invention, data acquisition is performed at a lower sampling rate, which greatly reduces a data volume and achieves the objectives of simplifying the structure of a radar system, lowering the complexity of the system, and reducing costs of data acquisition, transmission, storage, and processing.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments in the present invention without creative efforts shall fall within the protection scope of the present invention.

It is to be understood that when used in this specification and the appended claims, the terms "comprise" and "include" indicate the presence of described features, wholes, steps, operations, elements and/or components, but do not exclude the presence or addition of one or more other features, wholes, steps, operations, elements, components and/or a set thereof.

It is further to be understood that terms used in this specification of the present invention are merely intended to describe objectives of specific embodiments, but are not intended to limit the present invention. As used in this specification of the present invention and the appended claims, singular terms "a", "an" and "the" are also intended to include plural forms, unless otherwise specified in the context clearly.

It is to be further understood that the term "and/or" used in this specification of the present invention and the appended claims refers to one or more of any and all possible combinations of the associated items that is listed and includes the combinations.

Figure 1:
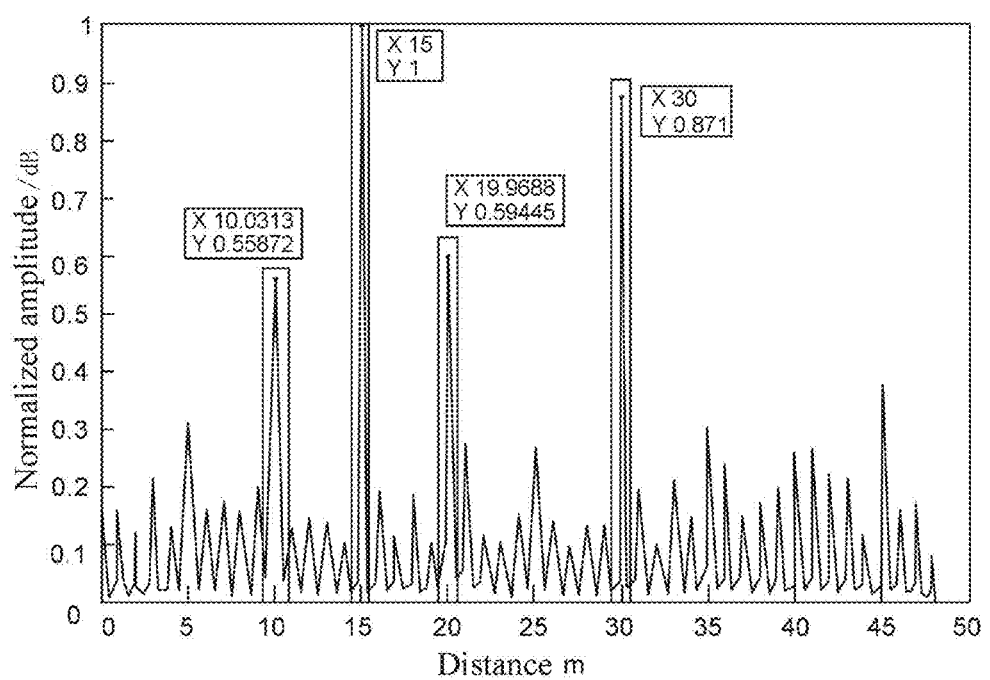
FIG. 1 is a schematic diagram of performing one-bit quantization and sampling on a frequency spectrum of a dechirped pulse compression signal of an LFMCW in the prior art.
Figure 2:
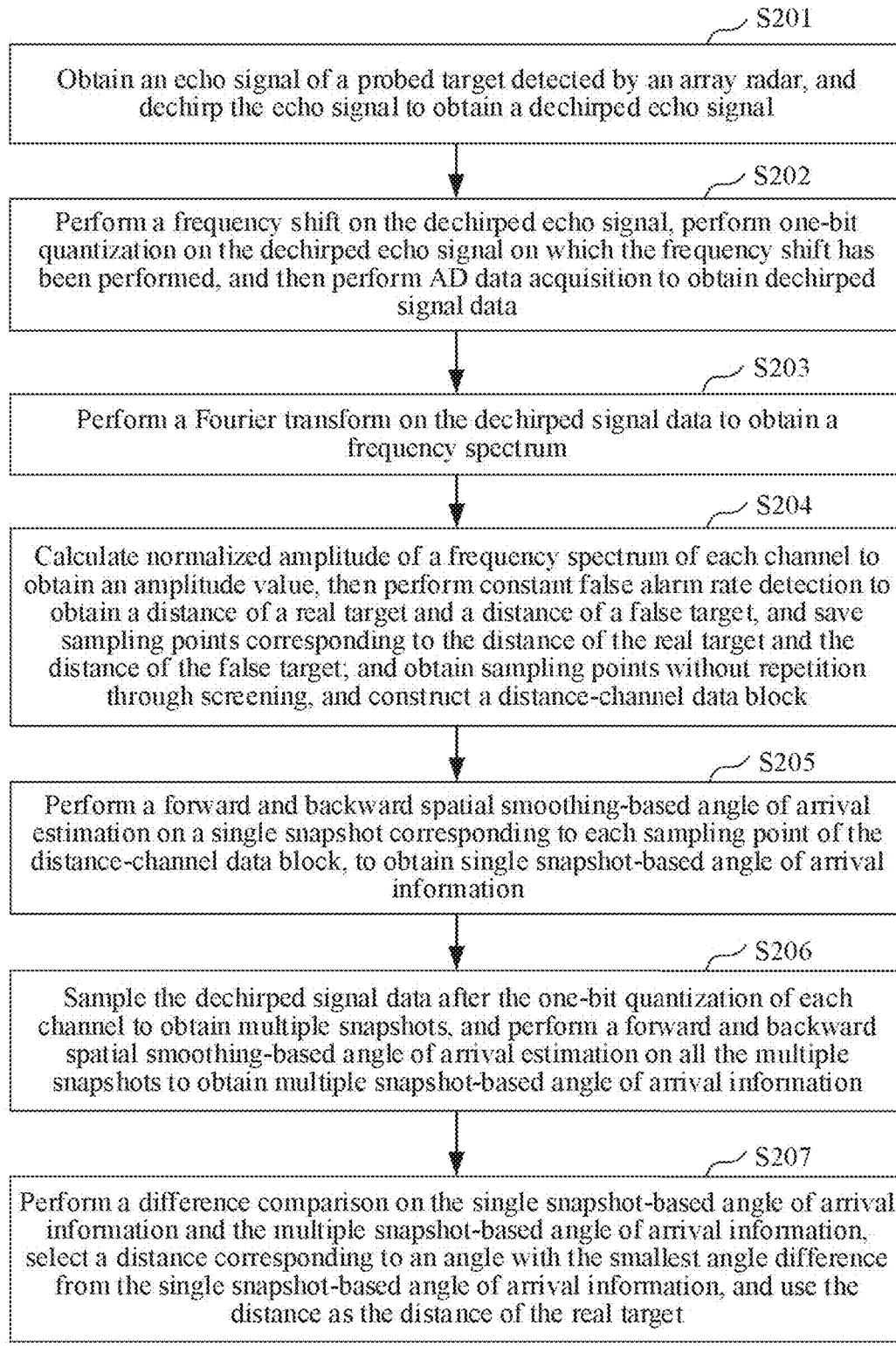
FIG. 2 is a schematic flowchart of a method for eliminating a one-bit signal harmonic false target according to an embodiment of the present invention.

FIG. 2 is a flowchart of a method for eliminating a one-bit signal harmonic false target according to an embodiment of the present invention.

As shown in FIG. 2, the method includes steps S201 to S207.

S201. Obtain an echo signal of a probed target detected by an array radar, and dechirp the echo signal to obtain a dechirped echo signal.

Figure 5:
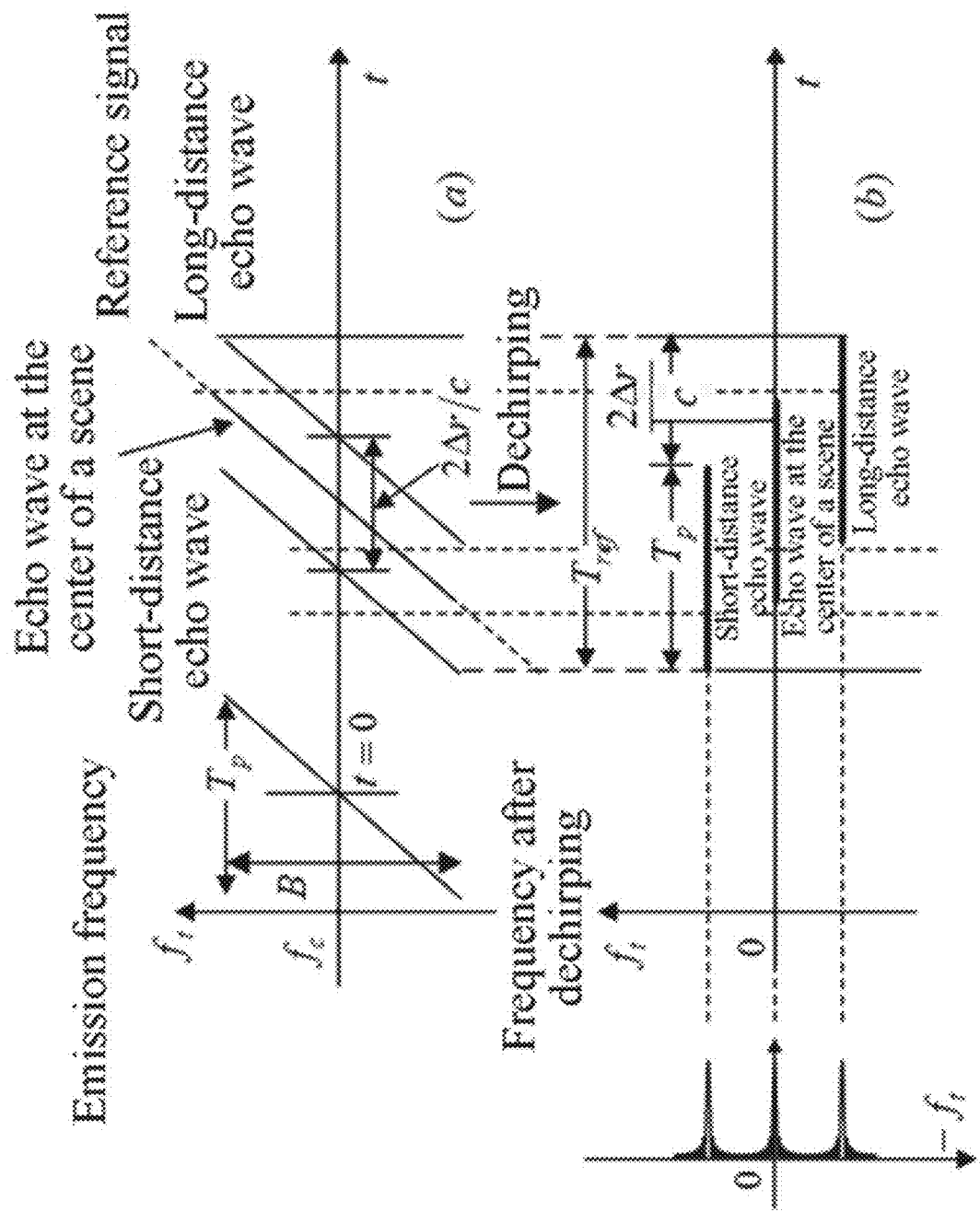
FIG. 5 a schematic diagram of a dechirping process according to an embodiment of the present invention.

With reference to FIG. 5, in this embodiment, the array radar emits a linear frequency modulation pulse signal to the probed target through an antenna. The pulse signal is propagated to the probed target. Subsequently, the echo signal is reflected by the probed target and is received by an array radar system. Next, the echo signal is dechirped to implement pulse compression. In this way, the array radar system may select a relatively low sampling frequency, to avoid the use of a high-precision and high-speed ADC (analog-to-digital converter).

In an embodiment, step S201 includes:
dechirping the echo signal according to the following formula:

$$S_{r1}(t) = A_1 \cdot rect\left(\frac{t-\tau}{T_p}\right) \cdot \exp\left[j2\pi\left(f_0(t-\tau) + \frac{1}{2}k(t-\tau)^2\right)\right],$$

$$S_{Ref}(t) = A_2 \cdot rect\left(\frac{t-\tau_0}{T_p}\right) \cdot \exp\left[j2\pi\left(f_0(t-\tau) + \frac{1}{2}k(t-\tau_0)^2\right)\right], \text{ and}$$

$$S_{IF}(t) = S_{r1}(t) \cdot S_{Ref}^* = A_1 \cdot A_2 \cdot rect\left(\frac{t-\tau}{T_p}\right) rect\left(\frac{t-\tau}{T}\right) \cdot \exp[j2\pi(f_b t + \phi)]$$

where $S_{r1}(t)$ is the echo signal reflected back by the probed target after a delay $\tau$; $S_{Ref}(t)$ is a reference signal of a type the same as that of $S_{r1}(t)$; $S_{IF}(t)$ is the dechirped echo signal;

$$f_b = k(\tau - \tau_0), \; rect\left(\frac{t}{T}\right) = \begin{cases} 1, t \le \frac{T}{2}, \text{ and } \phi = 2\pi f_0(\tau_0 - \tau) + \pi k(\tau^2 - \tau_0^2) \\ 0, \text{ others} \end{cases};$$

is a maximum amplitude value of the echo signal; $A_2$ is a maximum amplitude value of the reference signal; $\tau$ is a time delay of the echo signal relative to an emitted signal, and $\tau_0$ is a time delay of the reference signal relative to the emitted signal; $f_0$ is a center frequency; k is a frequency modulation rate of an LFMCW signal, $k=B/T_p$, B is signal bandwidth, and $T_p$ is signal pulse width; and • represents multiplication, and * represents a conjugate operation.

Figure 6:
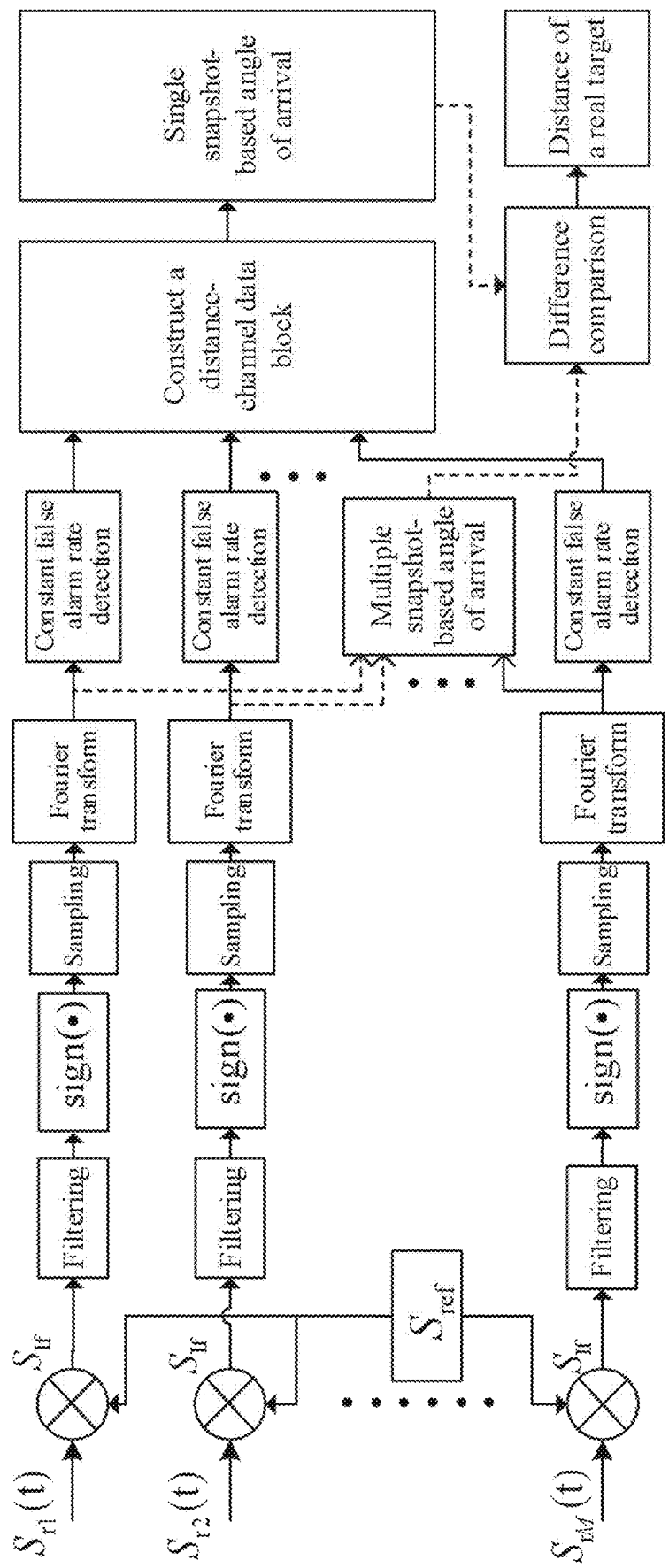
FIG. 6 is a block diagram of a principle based on which a false target of a harmonic wave of a one-bit signal is eliminated according to an embodiment of the present invention.

In this embodiment, as shown in a dechirped part in FIG. 6, a dechirping process is described by using the first receiving channel of a uniform linear array of the array radar as an example. The values of $A_1$, $A_2$, $\tau$, $\tau_0$, $f_0$, k, B and $T_p$ are substituted into the foregoing formula, so that the dechirped echo signal $S_{IF}(t)$ on which dechirping has been performed may be calculated.

S202. Perform a frequency shift on the dechirped echo signal, perform one-bit quantization on the dechirped echo signal on which the frequency shift has been performed, and then perform AD data acquisition to obtain dechirped signal data.

In this embodiment, to prevent the dechirped echo signal from causing interference during quantization, a frequency shift is first performed on the dechirped echo signal, and a frequency band of the dechirped echo signal is separated from a high-order harmonic wave, to obtain a dechirped echo signal without the high-order harmonic wave. Then, the dechirped echo signal on which the frequency shift has been performed is quantized into one-bit sampling data, and then AD data acquisition is performed to obtain the dechirped signal data, thereby reducing a bit width of the dechirped signal data, simplifying the structure of the system of the array radar with a function of angle measurement, reducing costs of data acquisition, transmission, storage, and processing, lowering the complexity of a system design, and improving the real-time processing capability of the system.

In an embodiment, step S202 includes:
performing, according to the following formula, the one-bit quantization on the dechirped echo signal on which the frequency shift has been performed to obtain the dechirped signal data: $S_{1b}(t)=\text{sign}[\text{real}(S_{IF}(t)]+j\cdot\text{sign}[\text{imag}(S_{IF}(t)]$, where $S_{1b}(t)$ is the dechirped signal data, and j is an imaginary unit.

In this embodiment, a process of one-bit quantization is shown in a part sign(·) in FIG. 6. The one-bit quantization is performed on the dechirped echo signal according to the foregoing formula to obtain the dechirped signal data.

S203. Perform a Fourier transform on the dechirped signal data to obtain a frequency spectrum.

In this embodiment, as shown in FIG. 6, a fast-time dimension of the dechirped signal data is transformed into a frequency domain through the Fourier transform, and the frequency spectrum is obtained.

Figure 3:
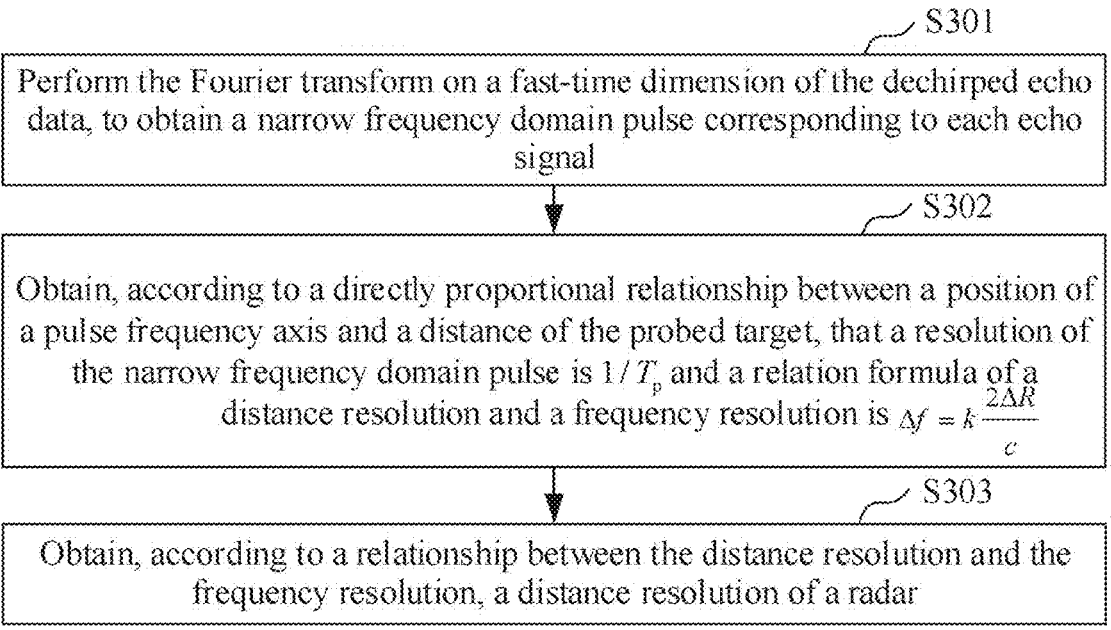
FIG. 3 is a schematic sub-flowchart of a method for eliminating a one-bit signal harmonic false target according to an embodiment of the present invention.

In an embodiment, as shown in FIG. 3, step S203 includes the following steps: S301. Perform the Fourier transform on a fast-time dimension of the dechirped signal data, to obtain a narrow frequency domain pulse corresponding to each echo signal.

S302. Obtain, according to a directly proportional relationship between a position of a pulse frequency axis and a distance of the probed target, that a resolution of the narrow frequency domain pulse is $1/T_p$ and a relation formula of a distance resolution and a frequency resolution is $$\Delta f = k \frac{2\Delta R}{c},$$

where $\Delta f$ is the frequency resolution, $\Delta R$ is the distance resolution, k is a chirp rate of an emitted signal, and c is the speed of light.

S303. Obtain, according to a relationship between the distance resolution and the frequency resolution, a distance resolution of a radar according to the following formula:

$$\Delta R = \frac{c}{2k}\frac{1}{T_P} = \frac{c}{2B},$$

where B represents an LFMCW signal (that is, the emitted signal or the reference signal).

In this embodiment, after one-bit quantization and sampling are performed on the dechirped signal, the Fourier transform is performed on the fast-time dimension of the dechirped signal data, and the corresponding narrow pulse of each echo wave may be obtained. As shown in the dechirped frequency spectrum diagram of FIG. 5(b), the position of a pulse frequency axis is directly proportional to a distance of a radar target. It can be learned from FIG. 5 that the resolution of the narrow frequency-domain pulse obtained through the transform is $1/T_p$ and the relation of the distance resolution and the frequency resolution is as follows:

$$\Delta f = k \frac{2\Delta R}{c}.$$

An expression of the distance resolution is further obtained as follows:

$$\Delta R = \frac{c}{2k}\frac{1}{T_P} = \frac{c}{2B}.$$

S204. Calculate normalized amplitude of a frequency spectrum of each channel to obtain an amplitude value, then perform constant false alarm rate detection to obtain a distance of a real target and a distance of a false target, and save sampling points corresponding to the distance of the real target and the distance of the false target; and obtain sampling points without repetition through screening, and construct a distance-channel data block.

Figure 7:
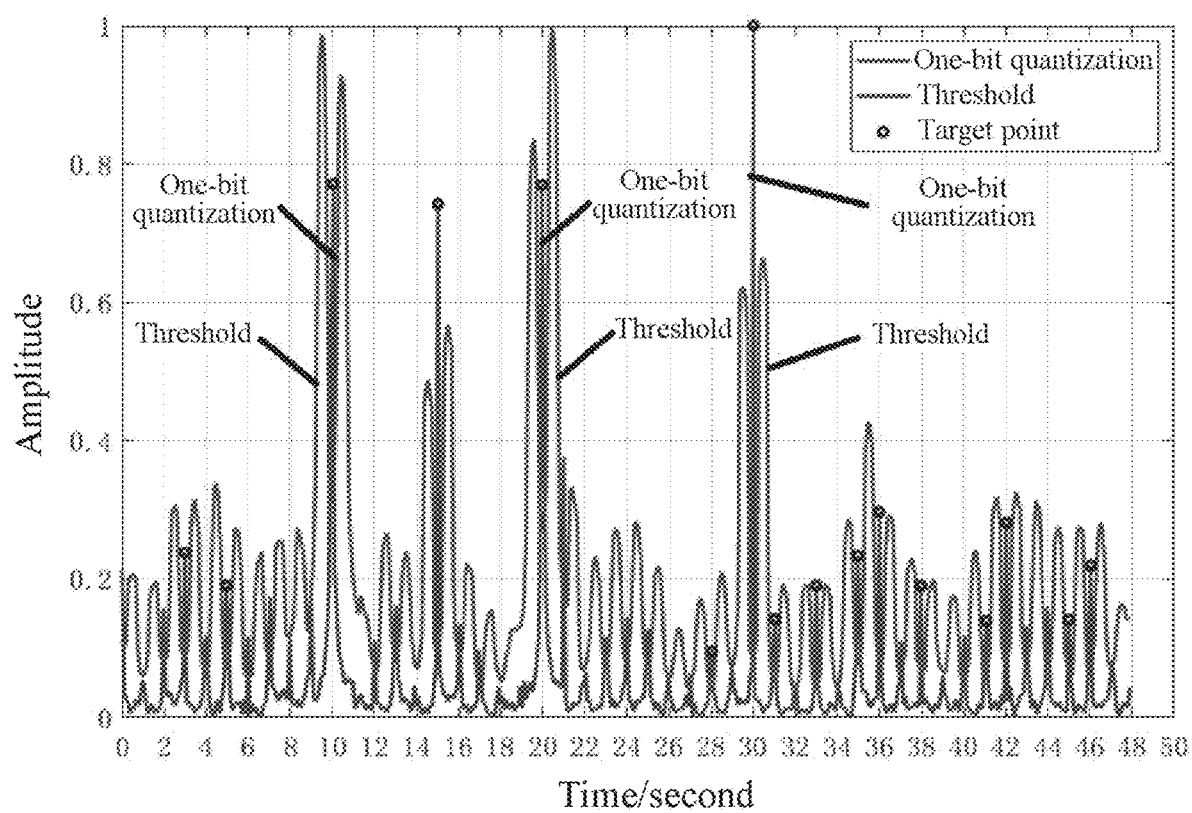
FIG. 7 is a schematic diagram of a constant false alarm rate detection result of a frequency spectrum of a dechirped echo signal on which one-bit quantization and sampling are performed according to an embodiment of the present invention.
Figure 8:
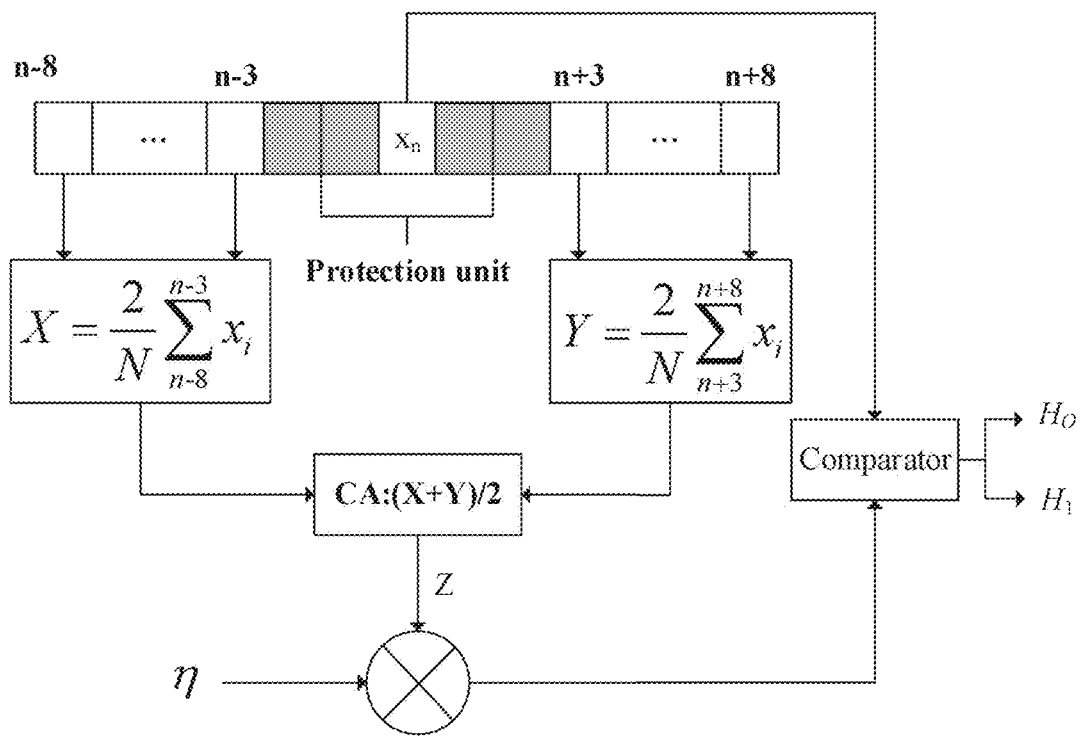
FIG. 8 is a block diagram of a basic principle of constant false alarm rate detection according to an embodiment of the present invention.

With reference to FIG. 7 and FIG. 8, in this embodiment, constant false alarm rate detection is performed after the normalized amplitude of the frequency spectrum of the channel is calculated. Noise waves with smaller amplitude are eliminated, and the distance of the real target and the distance of the false target are reserved. Black circles in FIG. 7 are target points left due to detection, and sampling points corresponding to distances of the target points are saved. Since there are repeated sampling points in sampling points saved in a plurality of channels, sampling points without repetition in the plurality of channels are recorded and saved as the distance-channel data block.

Figure 4:
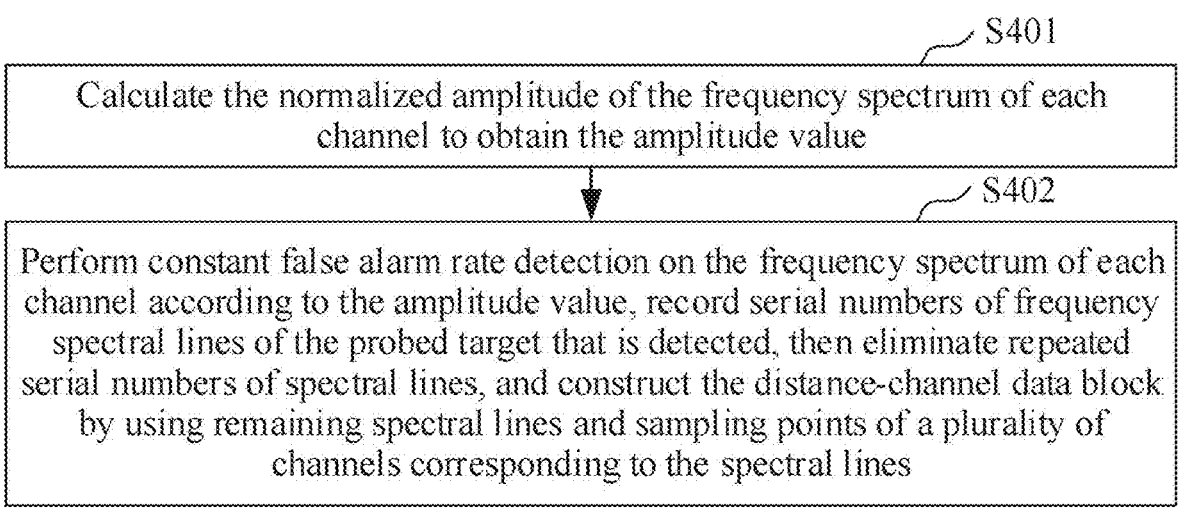
FIG. 4 is another schematic sub-flowchart of a method for eliminating a one-bit signal harmonic false target according to an embodiment of the present invention.

In an embodiment, as shown in FIG. 4, step S204 includes the following steps:

S401. Calculate the normalized amplitude of the frequency spectrum of each channel to obtain the amplitude value.

S402. Perform constant false alarm rate detection on the frequency spectrum of each channel according to the amplitude value, record serial numbers of frequency spectral lines of the probed target that is detected, then eliminate repeated serial numbers of spectral lines, and construct the distance-channel data block by using remaining spectral lines and sampling points of a plurality of channels corresponding to the spectral lines.

With reference to FIG. 8, in this embodiment, constant false alarm processing is respectively performed on frequency spectrum data of each channel in a one-dimensional space. The principle of constant false alarm rate detection is as follows: 8 spectral lines are respectively taken before and after a detected spectral line $x_n$, where 4 spectral lines of serial numbers $x_{n-2}$ and * and serial numbers $x_{n-1}$ and * are used as protection units, and 12 spectral lines of serial numbers $x_{n-8}$ to $x_{n-3}$ and serial numbers $x_{n+2}$ to $x_{n+8}$ are used as training units; the 12 spectral lines of the training units are accumulated and averaged to obtain an average value Z, and the average value is multiplied by a threshold coefficient $\eta$ of a CFAR, where $\eta$ is determined based on the constant false alarm rate and is adjustable in the system; and then, Z is compared with $x_n$, where if $x_n > \eta \times Z$, it is determined that a target appears, and amplitude $H_1$ and a serial number of the spectral line are outputted; and if $x_n < \eta \times Z$, it is determined that the target does not appear, and amplitude of the spectral line is set to zero, and the amplitude of zero $H_0$ and the serial number of the spectral line are outputted.

Figure 9:
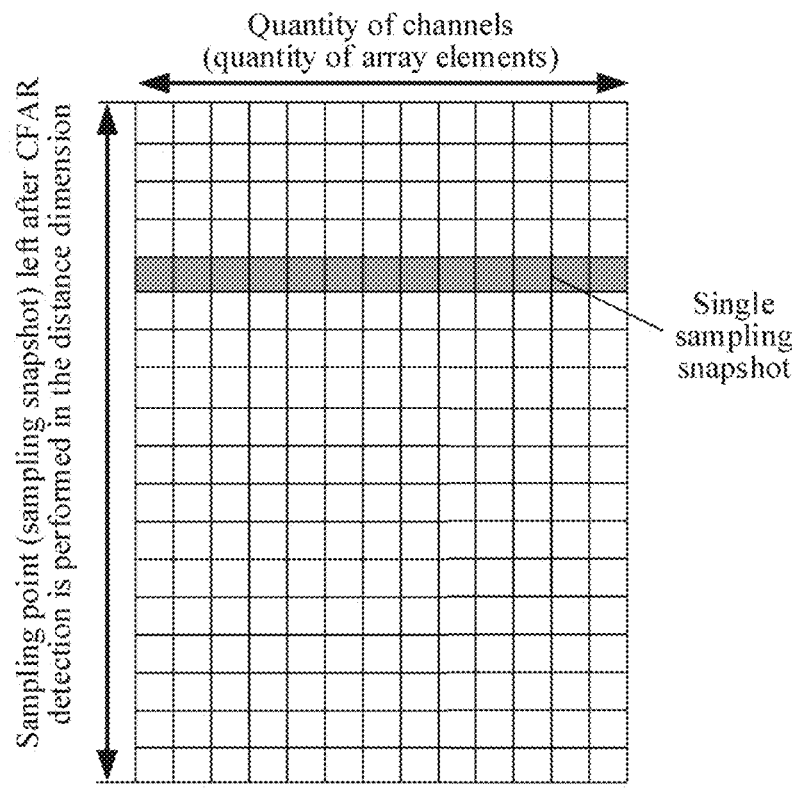
FIG. 9 is a schematic diagram of a distance-channel data block after rearrangement of constant false alarm detection according to an embodiment of the present invention.

According to the outputted amplitude $H_1$ and the serial number of the spectral line, noise waves with smaller amplitude are eliminated, and repeated serial numbers of spectral lines are also eliminated. Then, the distance-channel data block (as shown in FIG. 9) is constructed by using spectral lines corresponding to remaining serial numbers of spectral lines and the sampling points of the plurality of channels corresponding to the spectral lines.

S205. Perform a forward and backward spatial smoothing-based angle of arrival estimation on a single snapshot corresponding to each sampling point of the distance-channel data block, to obtain single snapshot-based angle of arrival information.

Figure 10:
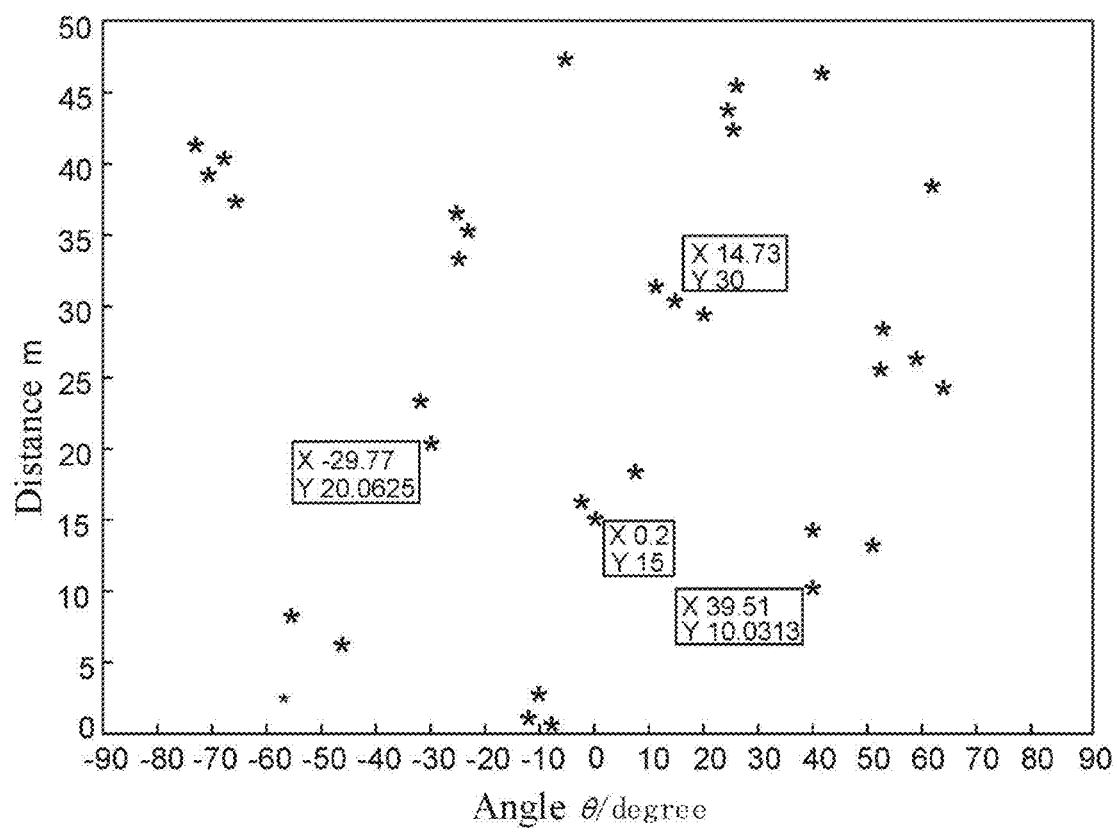
FIG. 10 is a diagram of a distance-angle relationship obtained based on a single snapshot according to an embodiment of the present invention.

In this embodiment, a spatial smoothing-based single snapshot angle of arrival estimation is performed on the sampling points of the distance-channel data block one by one, to obtain the single snapshot-based angle of arrival information, and then an angle-distance point diagram (as shown in FIG. 10) is drawn by using angles as horizontal coordinates and distances as vertical coordinates.

S206. Sample the dechirped signal data after the one-bit quantization of each channel to obtain multiple snapshots, and perform a forward and backward spatial smoothing-based angle of arrival estimation on all the multiple snapshots to obtain multiple snapshot-based angle of arrival information.

Figure 11:
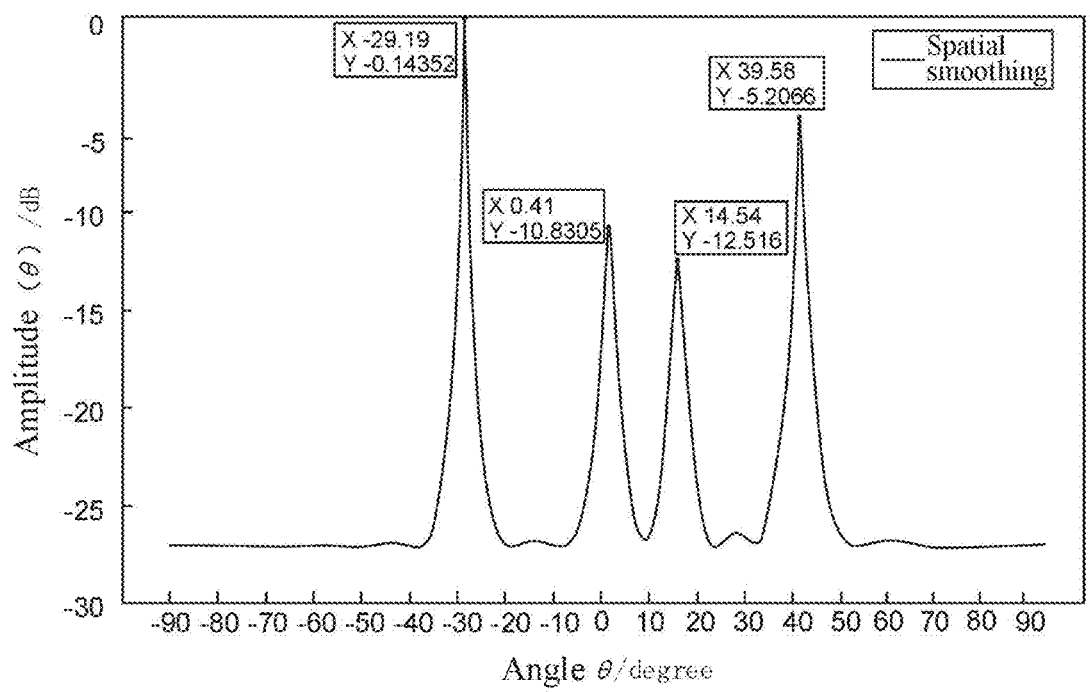
FIG. 11 is a schematic diagram of an angle of arrival estimation result obtained based on multiple snapshots according to an embodiment of the present invention.

In this embodiment, the dechirped signal data after the one-bit quantization of each channel is sampled. There are 16 channels, and a forward and backward spatial smoothing-based angle of arrival estimation is performed by using the multiple snapshots that are in the 16 channels and on which one-bit quantization and sampling are performed, to obtain direction of arrival information based on the multiple snapshots (as shown in FIG. 11).

In an embodiment, step S206 includes:

constructing, according to the following formula, a forward and backward spatial smoothing-based covariance matrix by using the multiple snapshots:

$$R_q^f(t) = E[x_q^f(t), x_q^f(t)^H] = A_M D^{q-1} R_s (D^{q-1})^H A_M^H + \sigma^2 I,$$

where $E[x_q^f(t), x_q^f(t)^H]$ represents an operation of calculating a covariance mean value, $R_q^f(t)$ represents a covariance matrix of a $q^{th}$ forward sub-array, a superscript f represents front, $x_q^f(t)$ represents an output of the $q^{th}$ forward sub-array (that is, signals received by all array elements in the $q^{th}$ sub-array), and $x_q^f(t)^H$ represents an operation of calculating a conjugate transpose of the output of the $q^{th}$ forward sub-array;

an entirety of $A_M D^{q-1} R_s (D^{q-1})^H A_M^H$ represents a covariance matrix of the echo signal after forward spatial smoothing, $R_s$ represents a covariance matrix of the echo signal, represents a direction matrix of a sub-array, $D^{q-1}$ represents an operation of $(q-1)^{th}$ power of a diagonal matrix D, an expression of D is:

$$D = \text{diag}\left(e^{j\frac{2\pi d}{\lambda}\sin\theta_1}, e^{j\frac{2\pi d}{\lambda}\sin\theta_2}, \ldots, e^{j\frac{2\pi d}{\lambda}\sin\theta_K}\right),$$

and $A_M^H$ represents a conjugate transpose of $A_M$; and an entirety of $\sigma^2 I$ represents a covariance matrix of noise, $\sigma^2$ represents an autocovariance of noise in the echo signal (which refers to an autocovariance of a noise signal), $\sigma$ represents a variance, and I represents an identity matrix; then, then performing eigenvalue decomposition according to the following formula:

$$R_f = \frac{1}{Q}\sum_{q=1}^{Q} R_q^f;$$

subsequently, dividing eigenvectors obtained through decomposition into a signal subspace and a noise subspace according to the following formula:

$$R_b = \frac{1}{Q}\sum_{q=1}^{Q} R_q^b;$$

and finally constructing a spatial spectral function according to an orthogonal relationship between the noise subspace and an array response matrix, and performing a peak search on the spatial spectral function to obtain the multiple snapshot-based angle of arrival information; and $$R_q^b(t) = E[x_q^b(t), x_q^b(t)^H];$$

Where Q represents the number of sub-arrays divided in a sliding manner, $R_q^b(t)$ represents a covariance matrix of a $q^{th}$ backward sub-array, a superscript b represents back, $x_q^b(t)$ represents an output of the $q^{th}$ backward sub-array, and $x_q^b(t)^H$ represents an operation of calculating a conjugate transpose of the output of the $q^{th}$ backward sub-array.

S207. Perform a difference comparison on the single snapshot-based angle of arrival information and the multiple snapshot-based angle of arrival information, select a distance corresponding to an angle with the smallest angle difference from the single snapshot-based angle of arrival information, and use the distance as the distance of the real target.

Specifically, step S207 includes:

performing calculation of the difference comparison according to the following formula, and obtaining the angle with the smallest angle difference from the single snapshot-based angle of arrival information:

$$A_{min} = \sum_{m=1}^{M} \min\left(\sum_{n=1}^{N} |\text{Angle1}(n) - \text{Angle2}(m)|\right),$$

where Angle1 is the multiple snapshot-based angle of arrival information, Angle2 is the single snapshot-based angle of arrival information, M is a quantity of angles in the multiple snapshot-based angle of arrival information, and N is a quantity of angles in the single snapshot-based angle of arrival information; and using the distance corresponding to the angle with the smallest angle difference in the single snapshot-based angle of arrival information as the distance of the real target.

Figure 12:
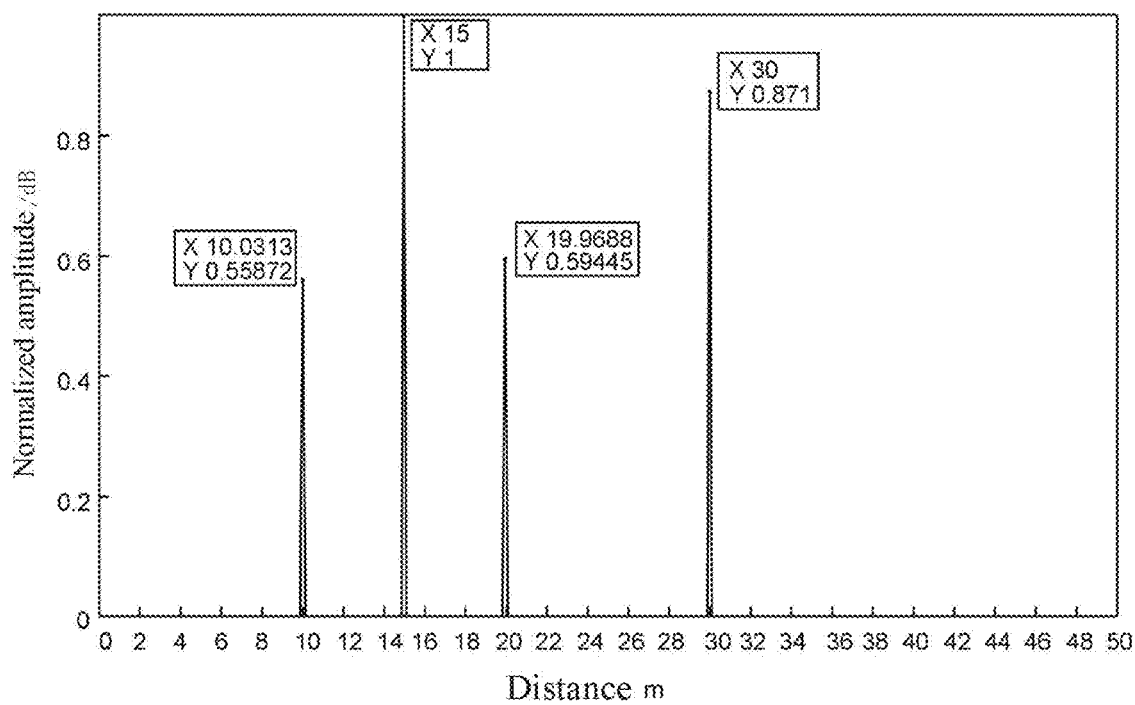
FIG. 12 is a frequency spectrum diagram of a real target according to an embodiment of the present invention.
Figure 13:
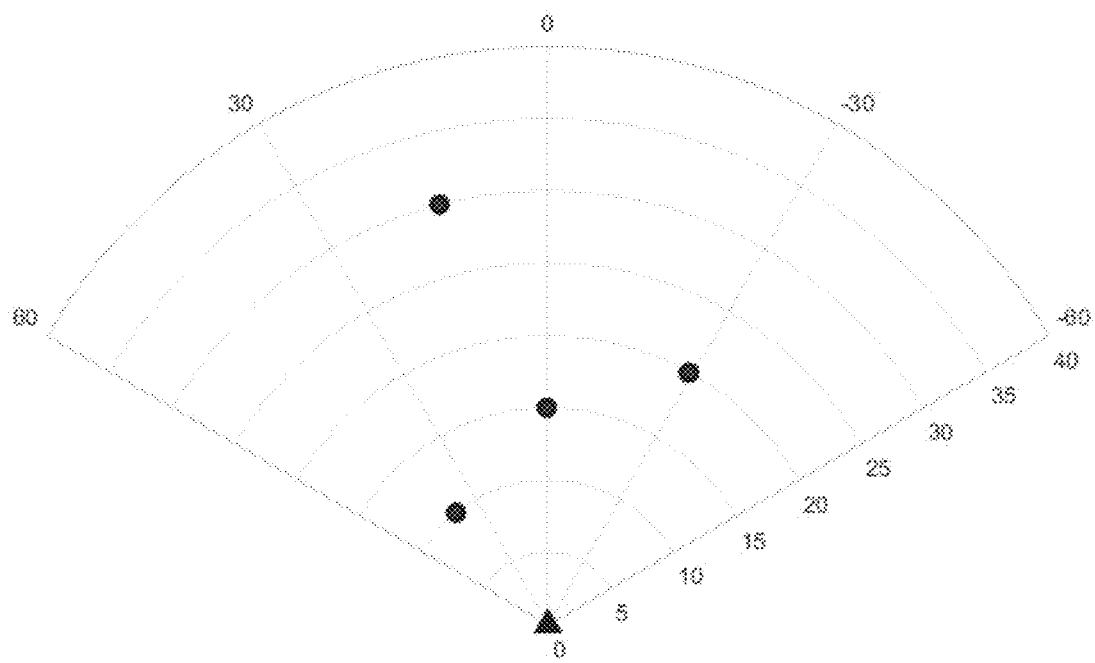
FIG. 13 is a diagram of a distance of a real target and a polar coordinate of an angle according to an embodiment of the present invention.

In this embodiment, according to the foregoing formula, angles in Angle2 are taken out one by one and compared with all angles in Angle1 in turn, to pick out a distance (the distance indicated by the vertical coordinate in FIG. 10) corresponding to the angle (that is, the angle shown in FIG. 10) with the smallest angle difference in Angle2 and use the distance as the distance of the real target (as shown in FIG. 12). In this way, a harmonic wave in the distance dimension is eliminated, and finally, the distance of the real target and a polar coordinate of the angle are obtained (as shown in FIG. 13).

In this embodiment of the present invention, a forward and backward spatial smoothing-based angle of arrival estimation is performed on each single snapshot of the distance-channel data block and on the multiple snapshots of each channel, to obtain the single snapshot-based angle of arrival information and the multiple snapshot-based angle of arrival information. The method for a spatial smoothing-based angle of arrival estimation is implemented by using a signal model of a uniform linear array.

Figure 14:
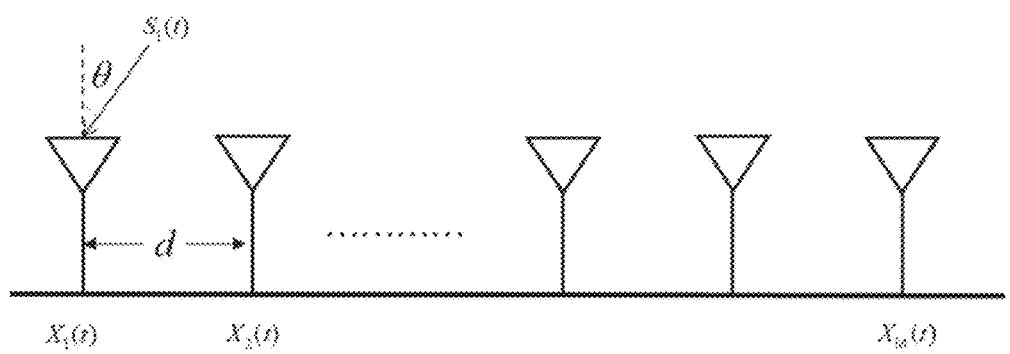
FIG. 14 is a schematic diagram of a signal model of a uniform linear array according to an embodiment of the present invention.

Specifically, the signal model for performing a spatial smoothing-based angle of arrival estimation is constructed. As shown in FIG. 14, a total quantity of signals X(t) received by all array elements of the uniform linear array may be represented as:

$$X(t) =$$

$$\begin{bmatrix} x_1(t) \\ x_2(t) \\ \vdots \\ x_M(t) \end{bmatrix}_{M \times N} = [a(\theta_1), a(\theta_2), \ldots a(\theta_K)]_{M \times K} \cdot \begin{bmatrix} s_1(t) \\ s_2(t) \\ \vdots \\ s_K(t) \end{bmatrix}_{K \times N} + \begin{bmatrix} n_1(t) \\ n_2(t) \\ \vdots \\ n_M(t) \end{bmatrix}_{M \times N}$$

where M represents a quantity of array elements of the uniform linear array, N represents a quantity of snapshots, K represents a quantity of sources (probed targets), the quantity of sources needs to satisfy: K<M, and $\theta_k$ (k=1, 2, 3, ..., K) represents that M lines are incident in a direction of arrival of a $k^{th}$ probed target.

According to the definition of the matrix, an expression is obtained as follows: X=AS+N, where $$X=[x_1(t),x_2(t),\ldots x_M(t)]_{M \times N}{}^T$$

$$S=[S_1(t),S_2(t),\ldots S_k(t)]_{K \times N}{}^T$$

$$A=[a(\theta_1),a(\theta_2),\ldots a(\theta_K)]_{M \times K}$$

$$N=[n_1(t),n_2(t),\ldots n_M(t)]_{M \times N}{}^T, \text{where}$$

X represents an output of an array element, A represents a matrix corresponding to an array, S represents an incident signal, and N represents array noise.

A phase difference $\varphi_k$ generated in a case that an echo signal from the $k^{th}$ probed target with the direction of arrival being $\theta_k$ (k=1, 2, 3, ..., K) is incident into two array elements is $$\varphi_k = \frac{2\pi d}{\lambda}\sin\theta_k,$$

where d represents a spacing between array elements in the uniform linear array, and $\lambda$ represents a wavelength of the LFMCW signal emitted by the array radar, where $\lambda=c/f_c$, c represents the speed of light, and $f_c$ represents a center frequency of the LFMCW signal emitted by the array radar.

An array response matrix of a uniform linear array with a spacing between array elements being d is:

$$A = [a(\theta_1), a(\theta_2), \ldots a(\theta_K)]_{M \times K}$$

$$= \begin{bmatrix} 1 & 1 & \ldots & 1 \\ e^{j\varphi_1} & e^{-j\varphi_2} & \ldots & e^{-j\varphi_K} \\ \vdots & \vdots & \ddots & \vdots \\ e^{-j(M-1)\varphi_1} & e^{-j(M-1)\varphi_2} & \ldots & e^{-j(M-1)\varphi_K} \end{bmatrix}_{M \times K}$$

$$= \begin{bmatrix} 1 & 1 & \ldots & 1 \\ e^{-j\frac{2\pi}{\lambda}d\sin\theta_1} & e^{-j\frac{2\pi}{\lambda}d\sin\theta_2} & \ldots & e^{-j\frac{2\pi}{\lambda}d\sin\theta_K} \\ \vdots & \vdots & \ddots & \vdots \\ e^{-j\frac{2\pi}{\lambda}(M-1)d\sin\theta_1} & e^{-j\frac{2\pi}{\lambda}(M-1)d\sin\theta_2} & \ldots & e^{-j\frac{2\pi}{\lambda}(M-1)d\sin\theta_K} \end{bmatrix}_{M \times K}$$

Figure 15:
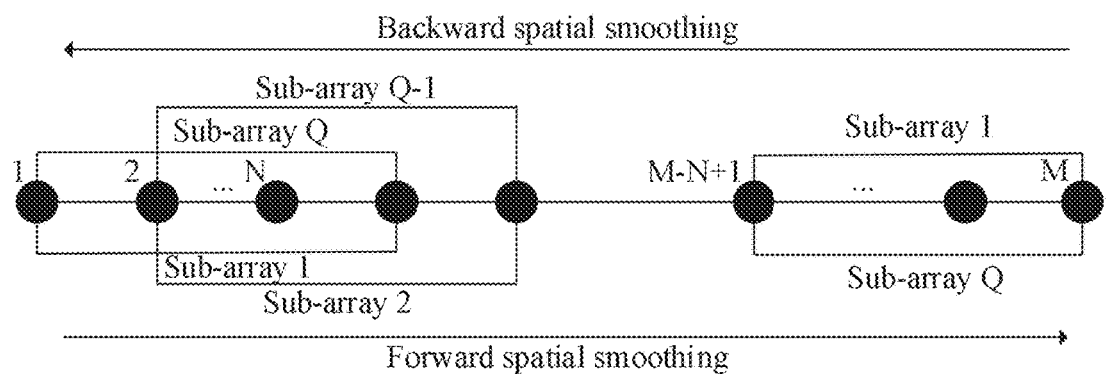
FIG. 15 is a schematic diagram of forward and backward spatial smoothing according to an embodiment of the present invention.

A process of performing an angle of arrival estimation by using a spatial smoothing technology is as follows:

The spatial smoothing technology is an effective method for dealing with coherent or strongly correlated signals, and a single snapshot angle of arrival estimation algorithm based on coherent smoothing has been widely used. The basic idea of the technology is to divide an equidistant linear array into a plurality of overlapping sub-arrays. Covariance matrices of the sub-arrays may be accumulated and averaged to replace a covariance matrix R of the original sense. As shown in FIG. 15, M equidistant linear arrays are divided into Q sub-arrays in a sliding manner, and each sub-array has N array elements, where N=M−Q+1. An output of an $h^{th}$ forward sub-array is defined as follows:

$$x_q^f(t)=[x_q(t),x_{q+1}(t),\ldots,(x_{q+N-1}(t)]^T=A_M D^{q-1}s(t)+n_q$$
$$(t), 1 \leq q \leq Q, \text{ where}$$

$A_M$ is a matrix with N×K dimensions, a column of the matrix is an N-dimensional steering vector $$a_M(\theta_1)(i = 1, 2, \ldots, K),$$

$$\text{and } D = \text{diag}\left(e^{j\frac{2\pi d}{\lambda}\sin\theta_1}, e^{j\frac{2\pi d}{\lambda}\sin\theta_2}, \ldots, e^{j\frac{2\pi d}{\lambda}\sin\theta_K}\right).$$

Therefore, a covariance matrix of the $h^{th}$ forward sub-array is as follows:

$$R_q^f(t)=E[x_q^f(t),x_q^f(t)^H]=A_M D^{q-1}R_s(D^{q-1})^H A_M{}^H+\sigma^2 I,$$

The symbol f represents forward, and a forward spatial smoothing-based covariance matrix is defined as follows:

$$R_f = \frac{1}{Q}\sum_{q=1}^{Q} R_q^f.$$

The symbol b represents backward, and a backward spatial smoothing-based covariance matrix is defined as follows:

$$R_b = \frac{1}{Q}\sum_{q=1}^{Q} R_q^b.$$

A relationship between $R_b$ and $R_f$ is a reverse conjugate array, and there is a reverse conjugation invariance between $R^b$ and $R_f$. Therefore, a forward and backward smoothing-based covariance matrix may be defined as follows:

$$\bar{R} = \frac{1}{2}(Rb + Rf).$$

Forward and backward spatial smoothing is used instead of merely forward spatial smoothing or backward spatial smoothing in this embodiment of the present invention is to take advantage of the reverse conjugation invariance. A quantity of sub-arrays may be increased to improve precision of an angle of arrival estimation.

Next, eigenvalue decomposition is performed on a covariance matrix:

$R=U\Sigma U^H$, where $\Sigma=\text{diag}(\lambda_1, \lambda_2, \ldots, \lambda_M)$, $\lambda_1 \geq \lambda_2 \geq \ldots \geq \lambda_K \geq \lambda_{K+1} \ldots \geq \lambda_M = \sigma^2$, diag represents a diagonal matrix, and $\sigma^2$ represents noise power of Gaussian white noise.

According to an order of sizes of the eigenvalues, eigenvectors $U_1, U_2, \ldots, U_K$ corresponding to a maximum eigenvalue $\lambda$ equal to a quantity of signals of K are used to form the signal subspace $U_S$, and eigenvectors $U_{K+1}, U_{K+2}, \ldots, U_M$ corresponding to remaining (M-K) eigenvalues are used to form the noise subspace $U_N$. In this case, a process of the eigenvalue decomposition is as follows:

$$R=U_S \Sigma_S U_S{}^H + U_N \Sigma_N U_N{}^H;$$

$$\Sigma_S=\text{diag}(\lambda_1,\lambda_2,\ldots,\lambda_M) \text{ and}$$

$\Sigma_S$ is a diagonal matrix formed by K relatively large eigenvalues, and $\Sigma_N$ is a diagonal matrix formed by M-K eigenvalues. The angle is enabled to vary, a spectral function is calculated according to $P_{MUSIC}=1/(a^H)(\theta)U_N U_N^H a(\theta))$ and an estimated value in the direction of arrival is obtained by calculating the peak.

An embodiment of the present invention further provides an apparatus for eliminating a one-bit signal harmonic false target. The apparatus for eliminating a one-bit signal harmonic false target is configured to perform any embodiment of the foregoing method for eliminating a one-bit signal harmonic false target. Specifically, FIG. 16 is a schematic block diagram of an apparatus for eliminating a one-bit signal harmonic false target according to an embodiment of the present invention.

Figure 16:
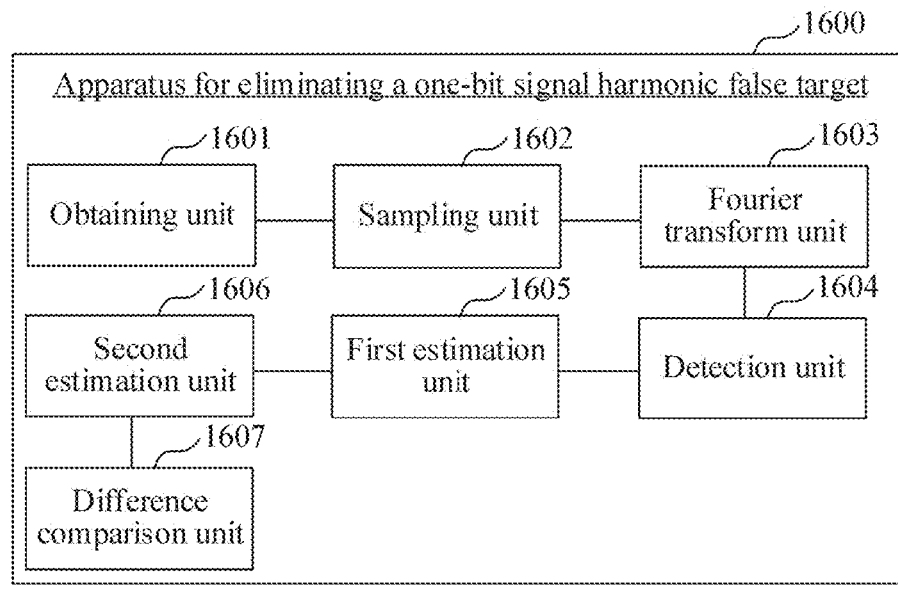
FIG. 16 is a schematic block diagram of an apparatus for eliminating a one-bit signal harmonic false target according to an embodiment of the present invention.

As shown in FIG. 16, the apparatus 1600 for eliminating a one-bit signal harmonic false target includes: an obtaining unit 1601, a sampling unit 1602, a Fourier transform unit 1603, a detection unit 1604, a first estimation unit 1605, a second estimation unit 1606, and a difference comparison unit 1607.

The obtaining unit 1601 is configured to: obtain an echo signal of a probed target detected by an array radar, and dechirp the echo signal to obtain a dechirped echo signal.

The sampling unit 1602 is configured to: perform a frequency shift on the dechirped echo signal, perform one-bit quantization on the dechirped echo signal on which the frequency shift has been performed, and then perform AD data acquisition to obtain dechirped signal data.

The Fourier transform unit 1603 is configured to perform a Fourier transform on the dechirped signal data to obtain a frequency spectrum.

The detection unit 1604 is configured to: calculate normalized amplitude of a frequency spectrum of each channel to obtain an amplitude value, then perform constant false alarm rate detection to obtain a distance of a real target and a distance of a false target, and save sampling points corresponding to the distance of the real target and the distance of the false target; and obtain sampling points without repetition through screening, and construct a distance-channel data block.

The first estimation unit 1605 is configured to perform a forward and backward spatial smoothing-based angle of arrival estimation on a single snapshot corresponding to each sampling point of the distance-channel data block, to obtain single snapshot-based angle of arrival information.

The second estimation unit 1606 is configured to: sample the dechirped signal data after the one-bit quantization of each channel to obtain multiple snapshots, and perform a forward and backward spatial smoothing-based angle of arrival estimation on all the multiple snapshots to obtain multiple snapshot-based angle of arrival information.

The difference comparison unit 1607 is configured to: perform a difference comparison on the single snapshot-based angle of arrival information and the multiple snapshot-based angle of arrival information, select a distance corresponding to an angle with the smallest angle difference from the single snapshot-based angle of arrival information, and use the distance as the distance of the real target.

The apparatus performs data acquisition at a lower sampling rate, which greatly reduces a data volume and achieves the objectives of simplifying the structure of a radar system, lowering the complexity of the system, and reducing costs of data acquisition, transmission, storage, and processing.

Since apparatus embodiments correspond to method embodiments, for the apparatus embodiments, reference may be made to the descriptions in the method embodiments, and details are not described herein again.

Figure 17:
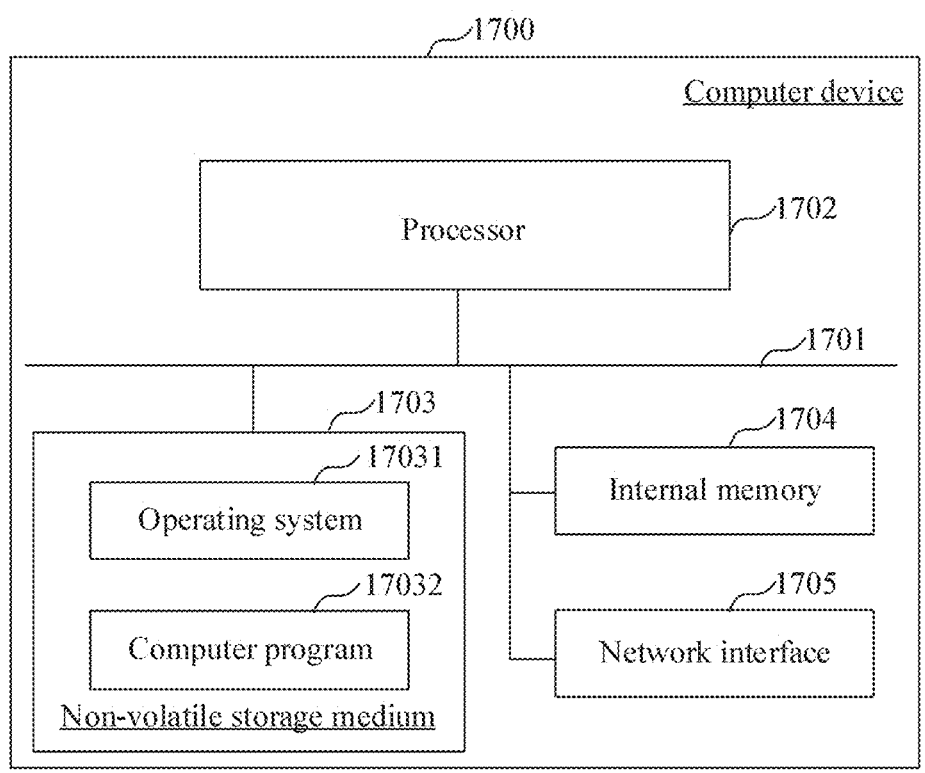
FIG. 17 is a schematic block diagram of a computer device according to an embodiment of the present invention.

The foregoing apparatus for eliminating a one-bit signal harmonic false target may be implemented in the form of a computer program, and the computer program may be run on the computer device shown in FIG. 17.

FIG. 17 is a schematic block diagram of a computer device according to an embodiment of the present invention. The computer device 1700 is a server. The server may be an independent server or may be a server cluster including a plurality of servers.

Referring to FIG. 17, the computer device 1700 includes a processor 1702, a memory, and a network interface 1705 that are connected by a system bus 1701. The memory includes a non-volatile storage medium 1703 and an internal memory 1704.

The non-volatile storage medium 1703 may store an operating system 17031 and a computer program 17032. When the computer program 17032 is executed, the processor 1702 may be caused to perform a method for eliminating a one-bit signal harmonic false target.

The processor 1702 is configured to provide computation and control capabilities, to support running of the entire computer device 1700.

The internal memory 1704 provides an environment for running the computer program 17032 in the non-volatile storage medium 1703. When the computer program 17032 is executed by the processor 1702, the processor 1702 may be caused to perform the method for eliminating a one-bit signal harmonic false target.

The network interface 1705 is configured to perform network communication, for example, to transmit data information. A person skilled in the art may understand that, the structure shown in FIG. 17 is only a block diagram of a part of a structure related to a solution of the present invention and does not limit the computer device 1700 to which the solution of the present invention is applied. Specifically, the computer device 1700 may include more or fewer components than those in the drawings, or include a combination of some components, or include different component layouts.

A person skilled in the art may understand that, the embodiment of the computer device shown in FIG. 17 does not constitute a limitation to a specific structure of the computer device. In other embodiments, the computer device may include components that are more or fewer than those shown in the figure, or some components may be combined, or a different component deployment may be used. For example, in some embodiments, the computer device may only include a memory and a processor. In these embodiments, structures and functions of the memory and the processor are the same as those in the embodiment shown in FIG. 17, and details are not described herein again.

It is to be understood that in the embodiments of the present invention, the processor 1702 may be a central processing unit (CPU). The processor 1702 may be another general-purpose processor, a digital signal processor (DSP), an application specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any conventional processor, or the like.

Another embodiment of the present invention provides a computer-readable storage medium. The computer-readable storage medium may be a non-volatile computer-readable storage medium. The computer-readable storage medium stores a computer program, where when the computer program is executed by a processor, the method for eliminating a one-bit signal harmonic false target according to the embodiments of the present invention is implemented.

The storage medium is a physical, non-transitory storage medium, for example, may be any physical storage medium that can store program code, such as a USB flash drive, a removable hard disk, a read-only memory (ROM), a magnetic disk, or an optical disc.

A person skilled in the art can clearly understand that for convenience and conciseness of description, for specific working processes of the foregoing described device, apparatus and units, reference may be made to the corresponding processes in the foregoing method embodiments, and details are not described herein again.

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for eliminating a one-bit signal harmonic false target, comprising:
    obtaining an echo signal of a probed target detected by an array radar, and dechirping the echo signal to obtain a dechirped echo signal;
    performing a frequency shift on the dechirped echo signal, performing one-bit quantization on the dechirped echo signal on which the frequency shift has been performed, and then performing AD data acquisition to obtain dechirped signal data;
    performing a Fourier transform on the dechirped signal data to obtain a frequency spectrum;
    calculating normalized amplitude of a frequency spectrum of each channel to obtain an amplitude value, then performing constant false alarm rate detection to obtain a distance of a real target and a distance of a false target, and saving sampling points corresponding to the distance of the real target and the distance of the false target; and obtaining sampling points without repetition through screening, and constructing a distance-channel data block;
    performing a forward and backward spatial smoothing-based angle of arrival estimation on a single snapshot corresponding to each sampling point of the distance-channel data block, to obtain single snapshot-based angle of arrival information;
    sampling the dechirped signal data after the one-bit quantization of each channel to obtain multiple snapshots, and performing a forward and backward spatial smoothing-based angle of arrival estimation on all the multiple snapshots to obtain multiple snapshot-based angle of arrival information; and
    performing a difference comparison on the single snapshot-based angle of arrival information and the multiple snapshot-based angle of arrival information, selecting a distance corresponding to an angle with the smallest angle difference from the single snapshot-based angle of arrival information, and using the distance as the distance of the real target.

2. The method for eliminating a one-bit signal harmonic false target according to claim 1, wherein the obtaining an echo signal of a probed target detected by an array radar, and dechirping the echo signal to obtain a dechirped echo signal comprises:
    dechirping the echo signal according to the following formula:

$$S_{r1}(t) = A_1 \cdot rect\left(\frac{t-\tau}{T_p}\right) \cdot \exp\left[j2\pi\left(f_0(t-\tau) + \frac{1}{2}k(t-\tau)^2\right)\right],$$

$$S_{Ref}(t) = A_2 \cdot rect\left(\frac{t-\tau_0}{T_p}\right) \cdot \exp\left[j2\pi\left(f_0(t-\tau_0) + \frac{1}{2}k(t-\tau_0)^2\right)\right],$$

$$S_{IF}(t) = S_{r1}(t) \cdot S_{Ref}^*(t) = A_1 \cdot A_2 \cdot rect\left(\frac{t-\tau}{T_P}\right) rect\left(\frac{t-\tau}{T}\right) \cdot \exp[j2\pi(f_b t + \phi)],$$

wherein $S_{r1}(t)$ is the echo signal reflected back by the probed target after a delay $\tau$; $S_{Ref}(t)$ is a reference signal of a type the same as that of $S_{r1}(t)$; $S_{IF}(t)$ is the dechirped echo signal;

$$f_b = k(\tau - \tau_0),$$

$$rect\left(\frac{t}{T}\right) = \begin{cases} 1, & t \leq \frac{T}{2} \\ 0, & \text{others} \end{cases}, \text{ and } \phi = 2\pi f_0(\tau_0 - \tau) + \pi k(\tau^2 - \tau_0^2);$$

$A_1$ is a maximum amplitude value of the echo signal; $A_2$ is a maximum amplitude value of the reference signal; $\tau$ is a time delay of the echo signal relative to an emitted signal, and $\tau_0$ is a time delay of the reference signal relative to the emitted signal; $f_0$ is a center frequency; k is a frequency modulation rate of an LFMCW signal, $k=B/T_p$, B is signal bandwidth, and $T_p$ is signal pulse width; and • represents multiplication, and * represents a conjugate operation.

3. The method for eliminating a one-bit signal harmonic false target according to claim 1, wherein the performing a frequency shift on the dechirped echo signal, performing one-bit quantization on the dechirped echo signal on which the frequency shift has been performed, and then performing AD data acquisition to obtain dechirped signal data comprises:
    performing, according to the following formula, the one-bit quantization on the dechirped echo signal on which the frequency shift has been performed to obtain the dechirped signal data:
    $S_{1b}(t) = \text{sign}[\text{real}(S_{IF}(t)] + j \cdot \text{sign}[\text{imag}(S_{IF}(t)]$, wherein $S_{1b}(t)$ is the dechirped signal data, and j is an imaginary unit.

4. The method for eliminating a one-bit signal harmonic false target according to claim 1, wherein the performing a Fourier transform on the dechirped signal data to obtain a frequency spectrum comprises:
    performing the Fourier transform on a fast-time dimension of the dechirped signal data, to obtain a narrow frequency domain pulse corresponding to each echo signal;
    obtaining, according to a directly proportional relationship between a position of a pulse frequency axis and a distance of the probed target, that a resolution of the narrow frequency domain pulse is $1/T_p$ and a relation formula of a distance resolution and a frequency resolution is $$\Delta f = k \frac{2\Delta R}{c},$$

wherein $\Delta f$ is the frequency resolution, $\Delta R$ is the distance resolution, k is a chirp rate of an emitted signal, and c is the speed of light; and obtaining, according to a relationship between the distance resolution and the frequency resolution, a distance resolution of a radar according to the following formula:

$$\Delta R = \frac{c}{2k} \frac{1}{T_P} = \frac{c}{2B},$$

wherein k is a frequency modulation rate of an LFMCW signal, B is signal bandwidth, and $T_p$ is signal pulse width.

5. The method for eliminating a one-bit signal harmonic false target according to claim 1, wherein the calculating normalized amplitude of a frequency spectrum of each channel to obtain an amplitude value, then performing constant false alarm rate detection to obtain a distance of a real target and a distance of a false target, and saving sampling points corresponding to the distance of the real target and the distance of the false target; and obtaining sampling points without repetition through screening, and constructing a distance-channel data block comprises:

calculating the normalized amplitude of the frequency spectrum of each channel to obtain the amplitude value; and performing constant false alarm rate detection on the frequency spectrum of each channel according to the amplitude value, recording serial numbers of frequency spectral lines of the probed target that is detected, then eliminating repeated serial numbers of spectral lines, and constructing the distance-channel data block by using remaining spectral lines and sampling points of a plurality of channels corresponding to the spectral lines.

6. The method for eliminating a one-bit signal harmonic false target according to claim 1, wherein the sampling the dechirped signal data after the one-bit quantization of each channel to obtain multiple snapshots, and performing a forward and backward spatial smoothing-based angle of arrival estimation on all the multiple snapshots to obtain multiple snapshot-based angle of arrival information comprises:

constructing, according to the following formula, a forward and backward spatial smoothing-based covariance matrix by using the multiple snapshots:

$$R_q^f(t) = E[x_q^f(t), x_q^f(t)^H] = A_M D^{q-1} R_s (D^{q-1})^H A_M^H + \sigma^2 I,$$
wherein $E[x_q^f(t), x_q^f(t)^H]$ represents an operation of calculating a covariance mean value, $R_q^f(t)$ represents a covariance matrix of a $q^{th}$ forward sub-array, a superscript f represents front, $x_q^f(t)$ represents an output of the $q^{th}$ forward sub-array, and $x_q^f(t)^H$ represents an operation of calculating a conjugate transpose of the output of the $q^{th}$ forward sub-array; and an entirety of $A_M D^{q-1} R_s (D^{q-1})^H A_M^H$ represents a covariance matrix of the echo signal after forward spatial smoothing, $R_s$ represents a covariance matrix of the echo signal, $A_M$ represents a direction matrix of a sub-array, $D^{q-1}$ represents an operation of $(q-1)^{th}$ power of a diagonal matrix D, an expression of D is as follows:

$$D = \mathrm{diag}\left(e^{j\frac{2\pi d}{\lambda}\sin\theta_1}, e^{j\frac{2\pi d}{\lambda}\sin\theta_2}, \ldots, e^{j\frac{2\pi d}{\lambda}\sin\theta_K}\right),$$

and $A_M^H$ represents a conjugate transpose of $A_M$; and an entirety of $\sigma^2 I$, represents a covariance matrix of noise, $\sigma^2$ represents an autocovariance of noise in the echo signal, $\sigma$ represents a variance, and I represents an identity matrix, d represents a spacing between array elements in uniform linear array, $\theta_k$ (k=1, 2, 3, ..., K) represents that M lines are incident in a direction of arrival of a $k^{th}$ probed target, $\lambda$ represents a wavelength of an LFMCW signal emitted by the array radar;

then performing eigenvalue decomposition according to the following formula:

$$R_f = \frac{1}{Q} \sum_{q=1}^{Q} R_q^f;$$

subsequently, dividing eigenvectors obtained through decomposition into a signal subspace and a noise subspace according to the following formula:

$$R_b = \frac{1}{Q} \sum_{q=1}^{Q} R_q^b;$$

and finally, constructing a spatial spectral function according to an orthogonal relationship between the noise subspace and an array response matrix, and performing a peak search on the spatial spectral function to obtain the multiple snapshot-based angle of arrival information, wherein $R_q^b(t) = E[x_q^b(t), x_q^b(t)^H]$; and Q represents the number of sub-arrays divided in a sliding manner, $R_q^b(t)$ represents a covariance matrix of a $q^{th}$ backward sub-array, a superscript b represents back, $x_q^b(t)$ represents an output of the $q^{th}$ backward sub-array, and $x_q^b(t)^H$ represents an operation of calculating a conjugate transpose of the output of the $q^{th}$ backward sub-array.

7. The method for eliminating a one-bit signal harmonic false target according to claim 6, wherein the performing a difference comparison on the single snapshot-based angle of arrival information and the multiple snapshot-based angle of arrival information, selecting a distance corresponding to an angle with the smallest angle difference from the single snapshot-based angle of arrival information, and using the distance as the distance of the real target comprises:

performing calculation of the difference comparison according to the following formula, and obtaining the angle with the smallest angle difference from the single snapshot-based angle of arrival information:

$$A_{min} = \sum_{m=1}^{M} \min\left(\sum_{n=1}^{N} |\mathrm{Angle1}(n) - \mathrm{Angle2}(m)|\right),$$

wherein Angle1 is the multiple snapshot-based angle of arrival information, Angle2 is the single snapshot-based angle of arrival information, M is a quantity of angles in the multiple snapshot-based angle of arrival information, and N is a quantity of angles in the single snapshot-based angle of arrival information; and finally, using the distance corresponding to the angle with the smallest angle difference in the single snapshot-based angle of arrival information as the distance of the real target.

8. A computer device, comprising a memory, a processor, and a computer program stored in the memory and executable on the processor, wherein when the processor executes the computer program with the steps of:

obtaining an echo signal of a probed target detected by an array radar, and dechirping the echo signal to obtain a dechirped echo signal;

performing a frequency shift on the dechirped echo signal, performing one-bit quantization on the dechirped echo signal on which the frequency shift has been performed, and then performing AD data acquisition to obtain dechirped signal data;

performing a Fourier transform on the dechirped signal data to obtain a frequency spectrum;

calculating normalized amplitude of a frequency spectrum of each channel to obtain an amplitude value, then performing constant false alarm rate detection to obtain a distance of a real target and a distance of a false target, and saving sampling points corresponding to the distance of the real target and the distance of the false target; and obtaining sampling points without repetition through screening, and constructing a distance-channel data block;

performing a forward and backward spatial smoothing-based angle of arrival estimation on a single snapshot corresponding to each sampling point of the distance-channel data block, to obtain single snapshot-based angle of arrival information;

sampling the dechirped signal data after the one-bit quantization of each channel to obtain multiple snapshots, and performing a forward and backward spatial smoothing-based angle of arrival estimation on all the multiple snapshots to obtain multiple snapshot-based angle of arrival information; and performing a difference comparison on the single snapshot-based angle of arrival information and the multiple snapshot-based angle of arrival information, selecting a distance corresponding to an angle with the smallest angle difference from the single snapshot-based angle of arrival information, and using the distance as the distance of the real target.

9. The computer device as claimed in claim 8, wherein the obtaining an echo signal of a probed target detected by an array radar, and dechirping the echo signal to obtain a dechirped echo signal comprises:

dechirping the echo signal according to the following formula:

$$S_{r1}(t) = A_1 \cdot rect\left(\frac{t-\tau}{T_p}\right) \cdot \exp\left[j2\pi\left(f_0(t-\tau) + \frac{1}{2}k(t-\tau)^2\right)\right],$$

$$S_{Ref}(t) = A_2 \cdot rect\left(\frac{t-\tau_0}{T_p}\right) \cdot \exp\left[j2\pi\left(f_0(t-\tau_0) + \frac{1}{2}k(t-\tau_0)^2\right)\right],$$

$$S_{IF}(t) = S_{r1}(t) \cdot S^*_{Ref}(t) = A_1 \cdot A_2 \cdot rect\left(\frac{t-\tau}{T_p}\right) rect\left(\frac{t-\tau}{T}\right) \cdot \exp[j2\pi(f_b t + \phi)],$$

wherein $S_{r1}(t)$ is the echo signal reflected back by the probed target after a delay $\tau$; $S^{Ref}(t)$ is a reference signal of a type the same as that of $S_{r1}(t)$; $S_{IF}(t)$ is the dechirped echo signal;

$$f_b = k(\tau - \tau_0),\ rect\left(\frac{t}{T}\right) = \begin{cases} 1, t \le \frac{T}{2} \\ 0, \text{others} \end{cases},\ \text{and}\ \phi = 2\pi f_0(\tau_0 - \tau) + \pi k(\tau^2 - \tau_0^2);$$

$A_1$ is a maximum amplitude value of the echo signal; $A_2$ is a maximum amplitude value of the reference signal; $\tau$ is a time delay of the echo signal relative to an emitted signal, and $\tau_0$ is a time delay of the reference signal relative to the emitted signal; $f_0$ is a center frequency; k is a frequency modulation rate of an LFMCW signal, $k=B/T_p$, B is signal bandwidth, and $T_p$ is signal pulse width; and • represents multiplication, and * represents a conjugate operation.

10. The computer device as claimed in claim 8, wherein the performing a frequency shift on the dechirped echo signal, performing one-bit quantization on the dechirped echo signal on which the frequency shift has been performed, and then performing AD data acquisition to obtain dechirped signal data comprises:

performing, according to the following formula, the one-bit quantization on the dechirped echo signal on which the frequency shift has been performed to obtain the dechirped signal data:

$S_{1b}(t)=\text{sign}[\text{real}(S_{IF}(t))]+j\cdot\text{sign}[\text{imag}(S_{IF}(t))]$, wherein $S_{1b}(t)$ is the dechirped signal data, and j is an imaginary unit.

11. The computer device as claimed in claim 8, wherein the performing a Fourier transform on the dechirped signal data to obtain a frequency spectrum comprises:

performing the Fourier transform on a fast-time dimension of the dechirped signal data, to obtain a narrow frequency domain pulse corresponding to each echo signal;

obtaining, according to a directly proportional relationship between a position of a pulse frequency axis and a distance of the probed target, that a resolution of the narrow frequency domain pulse is $1/T_p$ and a relation formula of a distance resolution and a frequency resolution is $$\Delta f = k\frac{2\Delta R}{c},$$

wherein $\Delta f$ is the frequency resolution, $\Delta R$ is the distance resolution, k is a chirp rate of an emitted signal, and c is the speed of light; and obtaining, according to a relationship between the distance resolution and the frequency resolution, a distance resolution of a radar according to the following formula:

$$\Delta R = \frac{c}{2k}\frac{1}{T_P} = \frac{c}{2B},$$

wherein k is a frequency modulation rate of an LFMCW signal, B is signal bandwidth, and $T_p$ is signal pulse width.

12. The computer device as claimed in claim 8, wherein the calculating normalized amplitude of a frequency spectrum of each channel to obtain an amplitude value, then performing constant false alarm rate detection to obtain a distance of a real target and a distance of a false target, and saving sampling points corresponding to the distance of the real target and the distance of the false target; and obtaining sampling points without repetition through screening, and constructing a distance-channel data block comprises:
  calculating the normalized amplitude of the frequency spectrum of each channel to obtain the amplitude value; and
  performing constant false alarm rate detection on the frequency spectrum of each channel according to the amplitude value, recording serial numbers of frequency spectral lines of the probed target that is detected, then eliminating repeated serial numbers of spectral lines, and constructing the distance-channel data block by using remaining spectral lines and sampling points of a plurality of channels corresponding to the spectral lines.

13. The computer device as claimed in claim 8, wherein the sampling the dechirped signal data after the one-bit quantization of each channel to obtain multiple snapshots, and performing a forward and backward spatial smoothing-based angle of arrival estimation on all the multiple snapshots to obtain multiple snapshot-based angle of arrival information comprises:
  constructing, according to the following formula, a forward and backward spatial smoothing-based covariance matrix by using the multiple snapshots:

$$R_q^f(t)=E[x_q^f(t), x_q^f(t)^H]=A_M D^{q-1} R_s (D^{q-1})^H A_M^H + \sigma^2 I,$$
  wherein $E[x_q^f(t), x_q^f(t)^H]$ represents an operation of calculating a covariance mean value, $R_q^f(t)$ represents a covariance matrix of a $q^{th}$ forward sub-array, a superscript f represents front, $x_q^f(t)$ represents an output of the $q^{th}$ forward sub-array, and $x_q^f(t)^H$ represents an operation of calculating a conjugate transpose of the output of the $q^{th}$ forward sub-array; and
  an entirety of $A_M D^{q-1} R_s (D^{q-1})^H A_M^H$ represents a covariance matrix of the echo signal after forward spatial smoothing, $R_s$ represents a covariance matrix of the echo signal, $A_M$ represents a direction matrix of a sub-array, $D^{q-1}$ represents an operation of $(q-1)^{th}$ power of a diagonal matrix D, expression of D is as follows:

$$D = \mathrm{diag}\left(e^{j\frac{2\pi d}{\lambda}\sin\theta_1}, e^{j\frac{2\pi d}{\lambda}\sin\theta_2}, \ldots, e^{j\frac{2\pi d}{\lambda}\sin\theta_K}\right),$$

and $A_M^H$ represents a conjugate transpose of $A_M$; and
  an entirety of $\sigma^2 I$ represents a covariance matrix of noise, $\sigma^2$ represents an autocovariance of noise in the echo signal, $\sigma$ represents a variance, and I represents an identity matrix, d represents a spacing between array elements in uniform linear array, $\theta_k$ (k=1, 2, 3, . . . , K) represents that M lines are incident in a direction of arrival of a $k^{th}$ probed target, $\lambda$ represents a wavelength of an LFMCW signal emitted by the array radar;
  then performing eigenvalue decomposition according to the following formula:

$$R_f = \frac{1}{Q}\sum_{q=1}^{Q} R_q^f;$$

subsequently,
  dividing eigenvectors obtained through decomposition into a signal subspace and a noise subspace according to the following formula:

$$R_b = \frac{1}{Q}\sum_{q=1}^{Q} R_q^b;$$

and finally,
  constructing a spatial spectral function according to an orthogonal relationship between the noise subspace and an array response matrix, and performing a peak search on the spatial spectral function to obtain the multiple snapshot-based angle of arrival information, wherein $R_q^b(t)=E[x_q^b(t), x_q^b(t)^H]$; and Q represents the number of sub-arrays divided in a sliding manner, $R_q^b(t)$ represents a covariance matrix of a $q^{th}$ backward sub-array, a superscript b represents back, $x_q^b(t)$ represents an output of the $q^{th}$ backward sub-array, and $x_q^b(t)^H$ represents an operation of calculating a conjugate transpose of the output of the $q^{th}$ backward sub-array.

14. The computer device as claimed in claim 13, wherein the performing a difference comparison on the single snapshot-based angle of arrival information and the multiple snapshot-based angle of arrival information, selecting a distance corresponding to an angle with the smallest angle difference from the single snapshot-based angle of arrival information, and using the distance as the distance of the real target comprises:
  performing calculation of the difference comparison according to the following formula, and obtaining the angle with the smallest angle difference from the single snapshot-based angle of arrival information:

$$A_{min} = \sum_{m=1}^{M}\min\left(\sum_{n=1}^{N}|Angle1(n) - Angle2(m)|\right),$$

wherein Angle1 is the multiple snapshot-based angle of arrival information, Angle2 is the single snapshot-based angle of arrival information, M is a quantity of angles in the multiple snapshot-based angle of arrival information, and N is a quantity of angles in the single snapshot-based angle of arrival information; and finally, using the distance corresponding to the angle with the smallest angle difference in the single snapshot-based angle of arrival information as the distance of the real target.

15. A non-transitory computer-readable storage medium, storing a computer program, wherein when the computer program is executed by a processor, the processor is caused to perform the steps of:
   obtaining an echo signal of a probed target detected by an array radar, and dechirping the echo signal to obtain a dechirped echo signal;
   performing a frequency shift on the dechirped echo signal, performing one-bit quantization on the dechirped echo signal on which the frequency shift has been performed, and then performing AD data acquisition to obtain dechirped signal data;
   performing a Fourier transform on the dechirped signal data to obtain a frequency spectrum;
   calculating normalized amplitude of a frequency spectrum of each channel to obtain an amplitude value, then performing constant false alarm rate detection to obtain a distance of a real target and a distance of a false target, and saving sampling points corresponding to the distance of the real target and the distance of the false target; and obtaining sampling points without repetition through screening, and constructing a distance-channel data block;
   performing a forward and backward spatial smoothing-based angle of arrival estimation on a single snapshot corresponding to each sampling point of the distance-channel data block, to obtain single snapshot-based angle of arrival information;
   sampling the dechirped signal data after the one-bit quantization of each channel to obtain multiple snapshots, and performing a forward and backward spatial smoothing-based angle of arrival estimation on all the multiple snapshots to obtain multiple snapshot-based angle of arrival information; and
   performing a difference comparison on the single snapshot-based angle of arrival information and the multiple snapshot-based angle of arrival information, selecting a distance corresponding to an angle with the smallest angle difference from the single snapshot-based angle of arrival information, and using the distance as the distance of the real target.

16. The non-transitory computer-readable storage medium as claimed in claim 15, wherein the obtaining an echo signal of a probed target detected by an array radar, and dechirping the echo signal to obtain a dechirped echo signal comprises:
   dechirping the echo signal according to the following formula:

$$S_{r1}(t) = A_1 \cdot rect\left(\frac{t-\tau}{T_p}\right) \cdot \exp\left[j2\pi\left(f_0(t-\tau) + \frac{1}{2}k(t-\tau)^2\right)\right],$$

$$S_{Ref}(t) = A_2 \cdot rect\left(\frac{t-\tau_0}{T_p}\right) \cdot \exp\left[j2\pi\left(f_0(t-\tau_0) + \frac{1}{2}k(t-\tau_0)^2\right)\right],$$

$$S_{IF}(t) = S_{r1}(t) \cdot S_{Ref}^*(t) = A_1 \cdot A_2 \cdot rect\left(\frac{t-\tau}{T_p}\right) rect\left(\frac{t-\tau}{T}\right) \cdot \exp[j2\pi(f_b t + \phi)],$$

wherein $S_{r1}(t)$ is the echo signal reflected back by the probed target after a delay $\tau$; $S_{Ref}(t)$ is a reference signal of a type the same as that of $S_{r1}(t)$; $S_{IF}(t)$ is the dechirped echo signal;

$$f_b = k(\tau - \tau_0), \; rect\left(\frac{t}{T}\right) = \begin{cases} 1, \; t \leq \frac{T}{2}, \\ 0, \; others \end{cases} \text{and } \phi = 2\pi f_0(\tau_0 - \tau) + \pi k(\tau^2 - \tau_0^2);$$

$A_1$ is a maximum amplitude value of the echo signal; $A_2$ is a maximum amplitude value of the reference signal; $\tau$ is a time delay of the echo signal relative to an emitted signal, and $\tau_0$ is a time delay of the reference signal relative to the emitted signal; $f_0$ is a center frequency; k is a frequency modulation rate of an LFMCW signal, $k=B/T_p$, B is signal bandwidth, and $T_p$ is signal pulse width; and • represents multiplication, and * represents a conjugate operation.

17. The non-transitory computer-readable storage medium as claimed in claim 15, wherein the performing a frequency shift on the dechirped echo signal, performing one-bit quantization on the dechirped echo signal on which the frequency shift has been performed, and then performing AD data acquisition to obtain dechirped signal data comprises:
   performing, according to the following formula, the one-bit quantization on the dechirped echo signal on which the frequency shift has been performed to obtain the dechirped signal data:
   $S_{1b}(t)=\text{sign}[\text{real}(S_{IF}(t)]+j\cdot\text{sign}[\text{imag}(S_{IF}(t)]$, wherein $S_{1b}(t)$ is the dechirped signal data, and j is an imaginary unit.

18. The non-transitory computer-readable storage medium as claimed in claim 15, wherein the performing a Fourier transform on the dechirped signal data to obtain a frequency spectrum comprises:
   performing the Fourier transform on a fast-time dimension of the dechirped signal data, to obtain a narrow frequency domain pulse corresponding to each echo signal;
   obtaining, according to a directly proportional relationship between a position of a pulse frequency axis and a distance of the probed target, that a resolution of the narrow frequency domain pulse is $1/T_p$ and a relation formula of a distance resolution and a frequency resolution is $$\Delta f = k \frac{2\Delta R}{c},$$

wherein $\Delta f$ is the frequency resolution, $\Delta R$ is the distance resolution, k is a chirp rate of an emitted signal, and c is the speed of light; and
   obtaining, according to a relationship between the distance resolution and the frequency resolution, a distance resolution of a radar according to the following formula:

$$\Delta R = \frac{c}{2k}\frac{1}{T_P} = \frac{c}{2B},$$

wherein k is a frequency modulation rate of an LFMCW signal, B is signal bandwidth, and $T_p$ is signal pulse width.

19. The non-transitory computer-readable storage medium as claimed in claim 15, wherein the calculating normalized amplitude of a frequency spectrum of each channel to obtain an amplitude value, then performing constant false alarm rate detection to obtain a distance of a real target and a distance of a false target, and saving sampling points corresponding to the distance of the real target and the distance of the false target; and obtaining sampling points without repetition through screening, and constructing a distance-channel data block comprises:

calculating the normalized amplitude of the frequency spectrum of each channel to obtain the amplitude value; and performing constant false alarm rate detection on the frequency spectrum of each channel according to the amplitude value, recording serial numbers of frequency spectral lines of the probed target that is detected, then eliminating repeated serial numbers of spectral lines, and constructing the distance-channel data block by using remaining spectral lines and sampling points of a plurality of channels corresponding to the spectral lines.

20. The non-transitory computer-readable storage medium as claimed in claim 15, wherein the sampling the dechirped signal data after the one-bit quantization of each channel to obtain multiple snapshots, and performing a forward and backward spatial smoothing-based angle of arrival estimation on all the multiple snapshots to obtain multiple snapshot-based angle of arrival information comprises:

constructing, according to the following formula, a forward and backward spatial smoothing-based covariance matrix by using the multiple snapshots:

$$R_q^f(t) = E[x_q^f(t), x_q^f(t)^H] = A_M D^{q-1} R_s (D^{q-1})^H A_M^H + \sigma^2 I,$$
wherein $E[x_q^f(t), x_q^f(t)^H]$ represents an operation of calculating a covariance mean value, $R_q^f(t)$ represents a covariance matrix of a $q^{th}$ forward sub-array, a superscript f represents front, $x_q^f(t)$ represents an output of the $q^{th}$ forward sub-array, and $x_q^f(t)^H$ represents an operation of calculating a conjugate transpose of the output of the $q^{th}$ forward sub-array; and an entirety of $A_M D^{q-1} R_s (D^{q-1})^H A_M^H$ represents a covariance matrix of the echo signal after forward spatial smoothing, $R_s$ represents a covariance matrix of the echo signal, $A_M$ represents a direction matrix of a sub-array, $D^{q-1}$ represents an operation of $(q-1)^{th}$ power of a diagonal matrix D, an expression of D is as follows:

$$D = \text{diag}\left(e^{j\frac{2\pi d}{\lambda}\sin\theta_1}, e^{j\frac{2\pi d}{\lambda}\sin\theta_2}, \ldots, e^{j\frac{2\pi d}{\lambda}\sin\theta_K}\right),$$

and $A_M^H$ represents a conjugate transpose of $A_M$; and an entirety of $\sigma^2 I$ represents a covariance matrix of noise, $\sigma^2$ represents an autocovariance of noise in the echo signal, $\sigma$ represents a variance, and I represents an identity matrix, d represents a spacing between array elements in uniform linear array, $\theta_k$ (k=1, 2, 3, ..., K) represents that M lines are incident in a direction of arrival of a $k^{th}$ probed target, $\lambda$ represents a wavelength of an LFMCW signal emitted by the array radar;

then performing eigenvalue decomposition according to the following formula:

$$R_f = \frac{1}{Q}\sum_{q=1}^{Q} R_q^f;$$

subsequently, dividing eigenvectors obtained through decomposition into a signal subspace and a noise subspace according to the following formula:

$$R_b = \frac{1}{Q}\sum_{q=1}^{Q} R_q^b;$$

and finally, constructing a spatial spectral function according to an orthogonal relationship between the noise subspace and an array response matrix, and performing a peak search on the spatial spectral function to obtain the multiple snapshot-based angle of arrival information, wherein
$R_q^b(t) = E[x_q^b(t), x_q^b(t)^H]$; and Q represents the number of sub-arrays divided in a sliding manner, $R_q^b(t)$ represents a covariance matrix of a $q^{th}$ backward sub-array, a superscript b represents back, $x_q^b(t)$ represents an output of the $q^{th}$ backward sub-array, and $x_q^b(t)^H$ represents an operation of calculating a conjugate transpose of the output of the $q^{th}$ backward sub-array.

* * * * *